United States Patent Office 3,450,717
Patented June 17, 1969

3,450,717
NOVEL SUBSTITUTED FLAVANOIDS
Josef Krämer and Klaus Irmscher, Darmstadt, Hans-Otto Vöge, Ober-Ramstadt, and Herbert Halpaap, Jugenheim, Germany, assignors to E. Merck Aktiengesellschaft, Darmstadt, Germany
No Drawing. Filed Aug. 26, 1964, Ser. No. 392,304
Claims priority, application Germany, Aug. 28, 1963, M 57,991; Oct. 5, 1963, M 58,433; Jan. 18, 1964, M 59,597; Mar. 4, 1964, M 60,149; May 9, 1964, M 60,951
Int. Cl. C07d *13/00, 21/00*
U.S. Cl. 260—340.5        31 Claims This invention relates to novel substituted flavanoids, their uses, and processes of production.

An object of this invention, therefore, is to provide novel flavanoid derivatives.

Another object is to provide processes for the production of these novel compounds, as well as novel intermediates therefor.

Still further objects include pharmaceutical preparations and methods of effecting therapeutic activity based on the novel compounds of this invention.

Upon further study of the specification and claims, other objects and advantages of the present invention will become apparent.

The novel substituted flavanoids of this invention correspond to the compounds of Formula I, as well as their acid addition salts and quaternary ammonium derivatives, as follows:

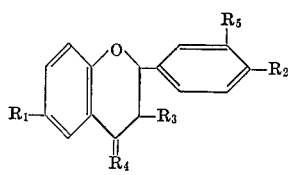

wherein:
$R_1$ and $R_2$ are identical or different and can represent OH; alkoxy of 1–10 carbon atoms and if desired substituted by other moieties; tetrahydropyranyl-(2)-oxy; acyloxy of 1–6 carbon atoms; $NO_2$; $NH_2$; alkylated $NH_2$ having 1–8 carbon atoms; or acylamino of 2–6 carbon atoms;

$R_3$ can represent H; OH; alkyl and alkoxy of 1–3 carbon atoms; $NH_2$; or Hal;

$R_4$ can represent O; H,OH; H,H; or H,$NH_2$;

$R_5$ can represent H or $R_1$;

Hal can represent Cl; Br; or I;

$R_2$ and $R_5$ together can also represent methylene dioxy; ethylene dioxy; or propylene dioxy; and wherein, in the 2,3-position, an additional double bond can be present; with the following provisions:

(A) when $R_3$=H, $R_4$=O, and there is a single bond connecting the 2,3-position, (1) $R_5$ represents $CH_3O$ if the following sub-provisions are observed: (a) $R_1$ is not $CH_3O$ and $R_2$ is neither $CH_3O$ or $CH_3OCH_2O$; (b) $R_1$ is not $NH_2$ and $R_2$ is none of OH, $CH_3O$ and $C_6H_5CH_2O$; (c) $R_1$ is not OH and $R_2$ is not $CH_3O$; (2) $R_2$ and $R_5$ together represent methylene dioxy subject to the following sub-provision: (a) $R_1$ is neither OH nor $NH_2$; (3) $R_5$ is H if the following sub-provision is observed: (a) $R_1$ is neither $CH_3O$ nor $NH_2$ and $R_2$ is not $CH_3O$;

(B) when $R_4$=O and there is a double bond connecting the 2,3-position, (1) $R_5$ is $CH_3O$ if the following sub-provision is observed: (a) $R_1$ is not $NO_2$, $R_2$ is not $CH_3O$, and $R_3$ is neither H nor OH; (2) $R_5$ is H if the following sub-provisions are observed: (a) $R_1$ and $R_2$ are neither both OH nor both $CH_3O$, and $R_3$ is neither H nor OH; (b) $R_1$ is not $C_2H_5O$, $R_2$ is neither $C_2H_5O$ nor $CH_3O$, and $R_3$ is not H; (c) $R_1$ and $R_3$ are not OH, and $R_2$ is not $CH_3O$.

The novel flavanoids and also the compounds of Formula I not subject to the provision given above possess very valuable pharmacological properties. Of particular importance, they exhibit a cholesterol-level-decreasing effect which has heretofore not yet been observed in flavanoids. Furthermore, depending upon substitution, estrogenic effects, ovario-stimulating effects, antispasmodic effects, and/or cardio-active effects are obtained.

To produce these novel flavanoids, there are provided various processes, as follows:

A compound of Formula II which is, if desired, produced in situ, or a compound of Formula III is treated with a cyclization agent, said formulae being represented as follows:

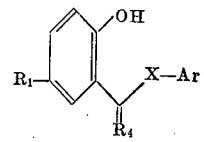

wherein:
Ar represents

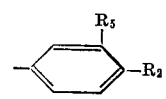

X represents $—CR_3=CX_1—$; $—CHR_3—CHX_1$; or

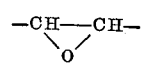

and
$X_1$ represents H, OH, Hal, or amino,
$R_1$ to $R_5$ and Hal are defined as above, and wherein phenolic hydroxy groups can also be present in protected form;

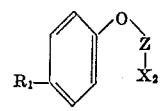

wherein:
Z represents $—CHR_3—CHAr—$ or $—CR_3=CAr-$,
$X_2$ represents COOH, COHal, $CH_2OH$ or $CH_2Hal$, and
Ar, $R_1$, $R_2$, $R_3$, $R_5$, and Hal have the above-mentioned composition.

A compound of the Formula IV is treated with a reducing agent.

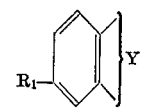

wherein:
Y represents

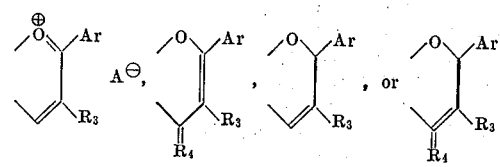

$R_4'$ represents O or H,OH, and $A^\ominus$ represents an anion of a strong acid,
Ar and $R_1$ to $R_5$ are defined as above, and wherein phenolic hydroxy groups can also be present in protected form.

In conjunction with the above processes, or independently therefrom, a double bond in the 2,3-position is inserted into a compound of Formula I by treatment with a dehydrogenating agent; and/or, in a compound of Formula I, one or several of the substituents $R_1$ to $R_5$ are converted into other substituents $R_1$ to $R_5$, in such a manner that protected hydroxy- and/or amino-groups are freed by treatment with hydrolyzing and/or hydrogenolyzing agents; or free hydroxy- and/or amino-groups are alkylated or acylated by treatment with alkylating or acylating agents; or nitro groups are reduced to amino groups. Alternatively, a keto group in the 4-position is transformed into an amino group by oxime formation and subsequent reduction, or a carboxylic acid or carboxylic acid alkyl ester group is transformed into a carboxylic acid amide group by treatment with an aminating agent, if desired passing through several stages. Likewise, in the 3-position, by treating with halogenation, oxidation, alkylation, or aminating agents, an Hal atom, or a hydroxy-, alkyl-, or amino-group can be introduced, and/or, if desired, compounds of the Formula I are converted, by treating with acids and alkylating agents, respectively, to their physiologically compatible acid addition salts and quaternary ammonium compounds, respectively.

As alkoxy groups in the residues $R_1$, $R_2$, and/or $R_5$, the following are exemplified: Methoxy, ethoxy, propoxy, isopropoxy, butoxy, isobutoxy, sec. butoxy, tert. butoxy, amyloxy, isoamyloxy, hexyloxy, isohexyloxy, heptyloxy, octyloxy, nonyloxy, decyloxy, as well as allyloxy, benzyloxy, cyclopentyloxy, cyclohexyloxy; further, the aforementioned groups with additional basic, acidic, or neutral substituents, these substituents preferably being the following: Amino; alkylated amino, such as dimethylamino, diethylamino, pyrrolidino, piperidino, morpholino; carboxy; carbalkoxy, such as carbomethoxy, carbethoxy; cyano; carboxamido; dialkylcarboxamido, such as dimethyl- or diethylcarboxamido. Correspondingly, suitable groups are 2-dimethylaminoethoxy,
2-diethylaminoethoxy,
2-pyrrolidinoethoxy,
2-piperidinoethoxy,
2-morpholinoethoxy,
3-dimethylaminopropoxy,
3-diethylaminopropoxy,
carboxymethoxy,
carbalkoxymethoxy, such as carbomethoxymethoxy,
carbethoxymethoxy,
carbopropoxymethoxy,
2-carboxyethoxy,
3-carboxypropoxy,
4-carboxybutoxy,
cyanomethoxy,
2-cyanoethoxy,
carboxamidomethoxy,
mono- and dialkylcarboxamidomethoxy of a total of 2–7 carbon atoms, such as
dimethylcarboxamidomethoxy,
diethylcarboxamidomethoxy,
pyrrolidinocarbonylmethoxy,
piperidinocarbonylmethoxy,
morpholinocarbonylmethoxy,
(2-hydroxyethylamino)-carbonylmethoxy,
2-carboxamidoethoxy, and
2-(dimethylcarboxamido)-ethoxy.

In the mentioned residues, additional double bonds may also be present.

In case $R_1$, $R_2$, and/or $R_5$ represent acyloxy or acylamino groups, the preferred acyl residues are those which are derived from carboxylic acids having up to 6 carbon atoms, advantageously formyl, acetyl, propionyl, butyryl, isobutyryl, valeryl, isovaleryl, caproyl, and isocaproyl. In case $R_1$ and/or $R_2$ represent amino groups, these can be mono-alkylated or dialkylated; preferably, the alkyl residues in one amino group can have a total of up to 8 carbon atoms, the following groups being particularly preferred: Methyl, ethyl, n-propyl, isopropyl, n-butyl, isobutyl, amyl, hexyl, dimethyl, diethyl di-n-propyl, diisopropyl, di-n-butyl, and/or diisobutylamino groups. The alkyl residues may also form, together with the nitrogen atom, a heterocyclic ring, for example a piperidine or pyrrolidine ring.

Alkyl groups in residue $R_3$ can be the following: Methyl, ethyl, n-propyl, and isopropyl; alkoxy groups can be methoxy, ethoxy, n-propoxy, and isopropoxy.

The residue $R_1$ most preferably represents the group $R_7$—CO—$CHR_6$—O—, wherein $R_6$ is H or a lower alkyl, such as methyl, ethyl, n-propyl, isopropyl, n-butyl, isobutyl, sec. butyl, tert. butyl, n-amyl, or isoamyl, and $R_7$ is OH, a lower alkoxy, such as methoxy, ethoxy, n-propoxy, isopropoxy, n-butoxy, isobutoxy, sec. butoxy, tert. butoxy, n-amyloxy, isoamyloxy, n-hexyloxy, $NH_2$ or alkylated amino, such as methyl-, ethyl-, n-propyl-, isopropyl-, n-butyl-, isobutyl-, amyl-, hexyl-, heptyl-, dimethyl-, methylethyl-, diethyl-, di-n-propyl-, diisopropylamino, 2-hydroxyethylamino, pyrrolidino, piperidino, or morpholino.

The compounds of Formula IV particularly comprise flavylium salts, $\Delta^2$- and $\Delta^3$-flavenes, flavanols, flavanones, flavones, or flavonols which can be substituted as mentioned above. The flavylium salts of Formula IV can contain anions of any desired strong acids; the flavylium salts can be present, for example, as chlorides, bromides, iodides, perchlorates, tetrachloroferrates(III), or hydrogen sulfates.

The flavane derivatives of Formula I are obtainable by cyclization of the compounds of Formula II. Particularly preferred compounds of Formula II are the chalcones ($R_4$=O, X=—CH=CH—, and —C($CH_3$)=CH—)

furthermore their dihalogenides, particularly the dibromides, halohydrins, or epoxides. However, compounds of Formula II in which $R_4$ represents H,H are also well suited for cyclization.

The compounds of Formula II are especially amenable to cyclization to form the flavane derivatives of Formula I by the effect of basic or acidic catalysts. Preferably, the following are used as catalysts: Alkalis, such as sodium hydroxide or potassium hydroxide, sodium amide, sodium hydride, basic-reacting salts, such as sodium acetate or potassium acetate, sodium carbonate or potassium carbonate; buffer solutions, for example those of citric acid and disodium phosphate, or of sodium dihydrogen phosphate or potassium dihydrogen phosphate and borax, or of boric acid, sodium hydroxide and potassium chloride; organic bases, such as piperidine, pyridine, tetramethyl guanidine, benzyl-trimethylammoniumhydroxide; mineral acids, such as hydrochloric acid, hydrobromic acid, sulfuric acid, phosphoric acid, polyphosphoric acid; organic sulfonic acids, such as toluene-sulfonic acid or camphorsulfonic acid; Lewis-acids, such as aluminum chloride, zinc chloride, or tin tetrachloride.

The cyclization can be conducted in the presence of an inert solvent, such as methanol, ethanol, dioxane, tetrahydrofuran, acetic ester, acetic acid, tetralin, benzene, toluene, or it can also be carried out, if desired, in mixtures of these solvents with one another or with water. It is also possible to use an excess of the cyclization agent as the solvent. The cyclization takes place at room temperature and can be accelerated by heating, if desired, up to the boiling point of the used solvent. The reaction time is several minutes up to several days.

The chalcones are preferably obtained by condensation of 2 - hydroxy - acetophenone or -propiophenone, substituted in the 5-position, with a p-substituted (or 3,4-disubstituted, respectively) benzaldehyde, or also they can be obtained from a p-substituted phenol and a p-substituted (and/or 3,4-disubstituted) cinnamic acid derivative in the presence of aluminum chloride. It is not necessary to isolate the chalcone which is used as the starting product; rather, it is also possible to react the 2-hydroxy-acetophenone substituted in the 5-position with the substituted benzaldehyde and then treat the mixture directly with the cyclization agent. If the operation is carried out in the presence of an oxidation agent, preferably hydrogen peroxide at low temperature, for example at 0° C., it is possible to introduce during this reaction at the same time a hydroxy group in the 3-position of the flavane system.

By reacting chalcones of the Formula II ($R_4$=O, X=—CH=CH—) with halogens, preferably bromine, the corresponding α,β-dihalogenides are arrived at, which can be converted into the halohydrins in the presence of water, for example by treating with moist acetone. If these halohydrins are treated with bases, 3-hydroxy-flavane derivatives are produced, probably by way of the corresponding epoxide. These derivatives can also be produced directly from the dihalogenides by treating with acetic acid/silver nitrate; the α,β-diacetoxy-chalcone produced is saponified by boiling with hydrochloric acid and is cyclized to the flavanone. The 3-hydroxy-flavanone derivatives are furthermore obtainable by reacting 2-hydroxy-phenacyl-halogenides, substituted in the 5-position, with substituted benzaldehydes in the presence of preferably basic catalysts; the epoxide which is produced as an intermediate does not have to be isolated in this process.

The starting compounds of Formula II ($R_4$=H,H) can be produced by condensation of a hydroquinone derivative, which is, if desired, etherified or esterified, with a compound of the formula Hal—$CH_2$—X—Ar. It is possible to guide the reaction such that the compound of Formula II does not have to be isolated. Furthermore, a compound of the formula

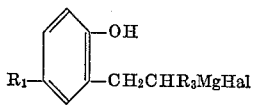

whose phenolic hydroxy group or groups can also be present in protected form, can be reacted with a benzaldehyde of the formula ArCHO to form a compound of Formula II ($R_4$=H,H), or a chalcone of the formula

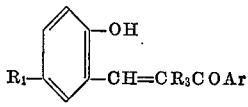

can be reduced to the compound of Formula II ($R_4$=H, H) by treating with a reducing agent, such as sodium amalgam, or by successive catalytic hydrogenation and reduction with a complex metal hydride.

Flavones of the Formula I ($R_4$=O, double bond in the 2,3-position) can be obtained by cyclization of a ketone of Formula II ($R_4$=O, X=—$CR_3$=$CX_1$—) or the tautomeric form thereof. Such ketones are preferably dibenzol-methanes ($R_3$=H, $X_1$=OH) which may, of course, also be present in the corresponding diketo form; such compounds can be converted to flavones by splitting off a water molecule. This conversion can be done, for example, by heating several hours with glycerin, preferably under nitrogen, in the presence of acids, such as concentrated hydrochloric acid, hydrobromic acid, hydriodic acid, sulfuric acid, phosphoric acid, glacial acetic acid, formic acid, or mixtures thereof. Also, acidic systems, such as glacial acetic acid/potassium acetate, or glacial acetic acid/sodium acetate can be employed, as well as phosphorus pentoxide, acetic anhydride, or potassium acetate in boiling alcohol. Preferably, heating is carried out for ½ to 3 hours at temperatures around 100° C. The reaction actually occurs in the cold state, but in that case it is correspondingly slower. If this process is carried out in the presence of an oxidation agent, for example employing a peracid, such as performic acid in chloroform, it is possible to introduce a hydroxy group in the 3-position simultaneously during this reaction.

It is, of course, possible to introduce substituents into the dibenzoyl-methane before the latter is cyclized. For example, a methylation at the methane carbon atom can be smoothly accomplished. In place of the dibenzoyl-methane, functional derivatives thereof can be used for cyclization. Thus, dibenzoyl-methane can be converted to an enamine, for example by reacting with benzylamine, which enamine can be acid hydrolized and simultaneously cyclized to flavone.

The bibenzoyl-methanes of Formula II ($R_3$=H, $R_4$=O, $X_1$=OH) are obtainable by a series of different methods, and they do not have to be necessarily isolated during the reaction.

For example, it is possible to condense a 5-substituted 2-hydroxy-acetophenone and/or propiophenone to 1,3-diketone by reaction with a derivative of a benzoic acid of the formula ArCOOH, preferably an ester of such a benzoic acid, under the customary conditions of an ester condensation. It is also possible to esterify a 5-substituted 2-hydroxy-acetophenone and/or -propiophenone in the customary manner, for example by reacting with a benzoic acid halogenide in the presence of a base, such as pyridine, and to convert the product obtained thereby into the dibenzoyl-methane under the conditions of a Baker-Venkataraman-transformation (in the presence of sodium, potassium, an alkali hydride, an alkali amide, an alkali carbonate, or an alkali hydroxide, preferably sodium hydroxide or potassium hydroxide in dry pyridine).

If the obtained ester of the 5-substituted 2-hydroxy-acetophenone and/or -propiophenone is treated with one of the above-mentioned cyclization reactants, the desired flavone is obtained directly. This can be accomplished preferably by several hours' heating with glycerin, preferably under nitrogen, in the presence of acids, such as glacial acetic acid, formic acid, glacial acetic acid/hydrochloric acid, glacial acetic acid/sulfuric acid, or phosphorus pentoxide, boiling acetic anhydride or potassium acetate in boiling alcohol.

The reaction of the 5-substituted 2-hydroxy-acetophenone and/or -propiophenone with the benzoic acid derivative can also be carried out under the conditions of a Kostanecki-Robinson-reaction. Here, one operates with a benzoic acid anhydride (ArCO)$_2$O in the presence of the corresponding sodium benzoate or potassium benzoate, or in the presence of a tertiary base, such as trimethyl- or triethylamine, at temperatures between 120 and 200° C. and thus arrives at flavone, without the dibenzoylmethane intermediate being isolated.

The dibenzoyl-methane derivatives of the Formula II ($R_3$=H, $R_4$=O, $X_1$=OH) are also obtainable by transforming a 4-benzoyl-oxycumarin to 3-benzoyl-4-hydroxycumarin and subsequent reaction with mineral acid, preferably hydrochloric acid, the intermediate diketo acid (II; $R_3$=COOH, $R_4$=O, $X_1$=OH) being decarboxylated under the conditions of the reaction.

The cyclization of the compounds of Formula III is normally carried out according to the same methods as the cyclization of the compounds of Formula II. Such compounds of Formula III in which $X_2$ represents COOH are preferably cyclized with acetyl chloride, phosphorus oxychloride, sulfuric acid, or polyphosphoric acid. Aluminum chloride or other Lewis-acids serve for the cyclization of the halogenides (III, $X_2$=COHal). The acids can, of course, be converted, before cyclization, into the corresponding acid halogenides, for example by means of thionyl chloride. Esters of these acids can also be used for cyclization, under hydrolyzing conditions.

It is not necessary to isolate the compounds of Formula III which are used as starting products; rather, they can also be produced in situ. This can be done, for example, by reacting a hydroquinone derivative, which can be etherified or esterified, if desired, with a halogen compound of the formula Ar—CHHal—CHR$_3$—X$_2$ or Ar—CH=CH—X$_2$ under the conditions stated above for the cyclization of the compounds of Formula II. When operating under mild, alkaline conditions—for example by treating with an alkali alcoholate—the compounds of Formula III can be isolated, if desired.

Compounds of Formula III (Z=—CR$_3$=CAr—, X$_2$=COOH) are obtainable, for example, by addition of an alkali salt of a p-substituted phenol to an ester of an acid of the formula ArC≡CCOOH and subsequent saponification, or by reacting a p-substituted phenol with an ester of an acid having the formula ArCOCH$_2$COOH (Simonis-reaction; in the latter case, the intermediate product III is normally not isolated).

In the above-described reactions of the compounds of Formulas II and III, the phenolic hydroxy groups can be present in protected (blocked) form; the blocking groups can be split off under the conditions of condensation. Thus, it is possible to cyclize such compounds in which hydroxy groups are present in protected form as tetrahydropyranyl-ethers, this being done in an acidic or an alkaline medium; in case of an alkaline cyclization, the hydroxy group is freed by subsequent brief boiling with acid. Compounds having a hydroxy group which is protected in ester form can likewise be condensed in acidic or alkaline medium, the ester group being saponified. Furthermore, ether groups, such as benzyl ether or methyl ether, are suitable as blocking agents. Such ethers can be split, for example, if hydrobromic acid or hydriodic acid is used as the cyclization agent.

The flavane derivatives of Formula I are also obtainable by reduction of compounds of Formula IV. Such a reduction can be carried out by catalytic hydrogenation, or by a chemical reducing agent.

Catalyst for the catalytic hydrogenation are, for example, noble metal catalysts, nickel catalysts, and cobalt catalysts, well as copper-chromium oxide. The noble metal catalysts can be present as carrier catalysts, as for example palladium on charcoal, calcium carbonate, or strontium carbonate, as oxide catalysts, as for example platinum oxide, or as finely divided metal catalysts. Nickel catalysts and cobalt catalysts are suitably used as Raney-metals; nickel can also be used on kieselguhr or pumice as carriers.

The hydrogenation can be conducted under ambient conditions or also at elevated temperature and/or increased pressure. Preferably, this process is conducted at pressures between 1 and 100 atmospheres and at temperatures between —80 and +150° C. Suitably, the reaction is carried out in the presence of a solvent, such as methanol, ethanol, isopropanol, tert. butanol, acetic acid ethyl ester, dioxane, glacial acetic acid, tetrahydrofuran, water, or mixtures thereof. In some cases, it is recommended to add catalytic quantities of a mineral acid, for example hydrochloric acid or sulfuric acid.

If, for purposes of hydrogenation, a compound of Formula IV with a basic nitrogen atom is employed, the free base, or also a salt of this base, can be used. During hydrogenation, precaution must be taken that the aromatic rings are not likewise attacked. Preferably, therefore, the process is conducted under such conditions that the hydrogenation is terminated after the calculated quantity of hydrogen has been absorbed. If starting products of Formula IV are employed in which phenolic hydroxy groups are protected by benzyl groups, these protective groups can be removed during the course of hydrogenation.

Catalytic hydrogenation is particularly suitable for the production of those compounds of Formula I in which R$_4$ represents H, H.

The reduction of the compounds of Formula IV is also successful with other reducing agents. Thus, it is possible to convert flavanones into the flavanes of Formula I by means of diborane; for this purpose, the flavanone is dissolved, for example, in diethylene glycol dimethyl ether; diborane is introduced under cooling; and the solution is allowed to stand overnight at room temperature. Furthermore, flavanones can be converted into their thioketals, preferably their ethylene-thioketals, which are then split reductively, for the most part by reaction with Raney-metals.

Flavonols can selectively be converted to 3-hydroxy-flavanones of the Formula I (R$_3$=OH, R$_4$=O), for example by means of sodium dithionite in an aqueous medium, or by means of Pd-charcoal in tetralin, the tetralin serving simultaneously as solvent and as hydrogen donor. In the last reaction, preferably temperatures around 200° C. are employed; normally, the reaction is finished after 1 to 5 hours.

It is further possible to carry out the reduction of a flavone in such a manner that simultaneously the keto group in the 4-position is reduced to a CHOH— or to a CH$_2$— group. For example, the 4-hydroxy-flavane derivative is obtained by reduction with sodium or aluminum amalgam or with Raney-nickel in aqueous alcohol, it being possible to operate at room temperature or up to boiling temperature; the reaction is finished after ½ hour to 3 days.

The starting compounds of Formula IV can be obtained in accordance with conventional methods. For example, the flavylium salts are obtainable by condensation of a 2,5-dihydroxy-benzaldehyde which is, if desired, etherified or esterified in the 5-position, with a ketone of the formula R$_3$CH$_2$COAr; the Δ$^2$- or Δ$^3$-flavenes are obtainable by reduction of the corresponding flavylium salts with lithium aluminum hydride; the remaining compounds of Formula IV can be obtained according to the methods described in this application.

It is furthermore possible to introduce a double bond in the 2,3-position of a compound of Formula I by treating with dehydrogenating agents. Here, it is not necessary to isolate the compound I since it is possible to make the dehydrogenating agent act upon the raw reaction mixture which contains the compound I. Further, in processes for producing the compound I, a dehydrogenating agent can be added, and after the reaction is finished, the 2,3-dehydro derivative of I can be directly isolated.

The expression "dehydrogenating agents" is to be understood, in accordance with the invention, in a broad sense. Suitable agents are, for example, halogens, such as chlorine, bromine, or iodine, N-haloamides, selenium dioxide, hydrogen peroxide, dehydrogenation catalysts, such as palladium, preferably in the presence of a hydrogen acceptor, halogenated quinones, such as chloranil and 2,3-dichloro-5,6-dicyanoquinone, pyridinium-bromide-perbromide, and other substances which generate active halogen. The dehydrogenation may be carried out in one stage, or also in several stages, for example, by converting a flavanone into the corresponding isonitroso-ketone and subsequent hydrolysis or reduction of the same.

Flavones of the Formula I (R$_4$=O, double bond in the 2,3-position) are especially suitable as 2,3-dehydro derivatives. For producing such flavone derivatives, the corresponding flavanones can be treated with dehydrogenating agents. It is also possible to produce the flavanones only in situ. For example, ketones of the above Formula II (R$_4$=O) can be employed in the reaction in place of the flavanones (I, R$_4$=O). In this case, the flavanones are produced as intermediates. As ketones of Formula II (R$_4$=O), the chalcones (X=—CR$_3$=CH—) are particularly suitable.

It is further possible to operate in such a manner that the ketones (II, R$_4$=O) are also not produced in an isolated manner, but are produced in situ only. For example, a substituted 2-hydroxy-acetophenone can be made to react with an aldehyde ArCHO, and the reaction mixture can be treated with one of the mentioned dehydrogenation agents.

For purposes of dehydrogenation, it is possible, for example, to treat the flavanones (I, $R_4$=O) with halogens, preferably chlorine or bromine, and subsequently split off hydrogen halide. If the ketones (II, $R_4$=O) constitute the initial starting materials, the chalcone dihalides are produced as intermediates which, under the influence of basic agents (preferably methanolic or ethanolic sodium or potassium hydroxide) lose 2 mols of hydrogen halide and are converted to flavones under simultaneous cyclization. In this reaction, phenolic OH groups can also be present in protected form and can be freed as described above. If a flavanone is chosen as starting point, the reaction can be conducted through the 3-halo-flavanone stage. It can be accomplished completely, for example, by introducing a halogen atom in the 3-position of a flavanone derivative which is unsubstituted in the 3-position, this being done by bromination under the influence of light. The dehydrohalogenation of the 3-halo-flavanones can be carried out with alcoholic, preferably methanolic alkali or ethanolic potassium hydroxide, or also by the effect of tertiary amines, such as collidine, lutidine, pyridine, picoline, further with lithium chloride or bromide, and lithium carbonate in dimethyl formamide, preferably at room temperature.

In place of halogens, N-halogeno-carboxylic acid amides or -imides can be used, too, during the halogenation of the compounds (I or II, $R_4$=O), preferably N-chloro- or N-bromo-succinimide. In this case, the reaction takes place in stages, according to the quantity of the agent used. If a flavanone is the starting point, at first a halogen atom is introduced in the 3-position. By means of excess reagent, the conversion to flavone takes place, it being possible that a halogen atom is retained in the 3-position. The reaction is preferably carried out by several hours' boiling of the reactants in an inert organic solvent, preferably chloroform or carbon tetrachloride. Peroxides, preferably benzoyl peroxide and/or irradiation of the solution accelerate the reaction.

Another dehydrogenation method comprisse the reaction of the ketone (II, $R_4$=O) or flavanone (I, $R_4$=O) with selenium dioxide. The reaction is preferably conducted at high temperatures, a high-boiling solvent being employed. Preferably, xylene, amyl alcohol, acetic anhydride, and similar agents are suitable; the reaction time is generally 3 to 15 hours. If acetic anhydride is used, the intermediate protection of phenolic hydroxy groups is unnecessary. In other cases, the reaction is more successful with protected, for example, esterified hydroxy groups.

A further dehydrogenating agent which can be advantageously used is hydrogen peroxide in alkaline solution. If a chalcone is selected as the starting product, the reaction takes place via the epoxide and the 3-hydroxy-flavanone. 3-Hydroxy-flavones (flavonols) are particularly advantageously obtained by this method. Preferably, the reaction is allowed to take place in aqueous, aqueous-alcoholic, or alcoholic, for example methanolic, solution, and at room temperature; at the beginning of the reaction, cooling is also employed. The peroxide is used in excess in approximately a 10 to 30% proportion in aqueous solution. The reaction is essentially finished after several hours; advantageously, the solution is allowed to stand for some time, for example overnight, in order to end the reaction completely.

A further method is the dehydrogenation of flavanones (preferably of 3-hydroxy-flavanones) with palladium in the presence of a hydrogen acceptor. Generally, unsaturated acid derivatives, such as cinnamic acid, maleic acid anhydride, or similar compounds are used as acceptors. Preferably, the process is carried out in the presence of an inert solvent, such as water, and at about between 50° C. and the boiling point of the solvent used.

A further variant consists in the reaction of the flavanones with esters of nitrous acid, preferably butyl nitrite or isoamyl nitrite, in the presence of acid, preferably a mineral acid, and subsequent conversions of the obtained isonitroso-ketones. For example, the isonitroso-ketone can be converted into the corresponding flavonol by hydrolysis with boiling 10% sulfuric acid in glacial acetic acid or with hydrochloric acid. If an excess of acid is employed during the nitroso group introduction into the flavanone, the flavonol is obtained directly. If, on the other hand, the isonitroso-ketone is treated with reducing agents, for example stannous chloride, 3-amino-flavones are produced.

The above enumeration of the dehydrogenating agents which can be employed in accordance with the invention is only exemplary. It is, of course, possible within the scope of the invention to use also other dehydrogenating agents under suitable conditions.

In a compound of Formula I, it is possible to convert one or several of the substituents $R_1$ to $R_5$ into other substituents $R_1$ to $R_5$. Thus, protected hydroxy and/or amino groups may be liberated by hydrolysis or reduction. For example, hydroxy groups and/or acylated amino groups which had been esterified or protected in the form of tetrahydropyranyl ether or benzyl ether can be hydroylzed in a basic, neutral, or acidic medium, preferred bases being aqueous, aqueous-alcoholic, or alcoholic sodium or potassium hydroxide, the preferred acids being hydrochloric and sulfuric acids. Aside from simple hydrolysis, benzyloxy, benzylamino, or benzalamino groups can be split hydrogenolytically.

It is further more possible to alkylate or to acylate free hydroxy groups. Such hydroxy groups can be of the phenolic type (in the 6-, 3'-, and/or 4'-position) or of the alcoholic type (in the 3- or 4-position, or as a substituent attached to an alkoxy group).

The etherification can, for example, take place by reaction with corresponding alkyl halogenides, -sulfates, or lower alkyl esters in the presence of an alkali, such as sodium or potassium hydroxide or carbonate; one of the customary inert solvents can also be present. Of importance is the conversion of phenolic hydroxy groups into such alkoxy groups which still contain basic or acidic groups as substituents. Correspondingly, the phenolic starting compounds can be reacted, for example, with methyl iodide, dimethyl sulfate, ethyl-, propyl-, isopropyl-, n-butyl-, isobutyl-, amyl, and isoamyl-halogenides, 2-dialkylamino-ethyl-, such as 2-dimethylamino-ethyl-, 2-diethylamino-ethyl-, 2-methylamino-ethyl - halogenides, 2-pyrrolidino-ethyl-, 2 - piperidino - ethyl-, 2 - morpholino-ethyl-, or 3-dialkylamino-propyl-halogenides, or with the corresponding alcohols. Such etherifications are carried out, for example, according to the principle of a Williamson-synthesis, the corresponding alkali phenolates (sodium or potassium phenolates) being made the starting materials.

Moreover, it is possible to react the free phenols with the corresponding alcohols and/or the substituted amino alcohols in the presence of acidic catalysts, such as sulfuric acid, phosphoric acid, p-toluene-sulfonic acid. It is also possible to etherify the phenolic OH— groups with halogen carboxylic acids or their derivatives, for example esters, amides, nitriles; particularly, the residue

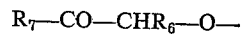

can be introduced in this manner in the 6-position. Suitable halogen carboxylic acids are, for example, chloro-acetic acid or bromo-acetic acid, α-chloro- or α-bromo-propionic acid, α-chloro-butyric or α-bromo-butyric acids, α-chloro-valeric or α-bromo-valeric acid, α-chloro-caproic or α-bromo-caproic acids, α-chloro- or α-bromo-heptanoic acids, such as α-chloro- or α-bromoiso-amyl acetic acid, as well as their methyl and ethyl esters, amides, dialkyl-amides, or nitriles.

An acylation of hydroxy groups can be provided by heating same with an anhydride or halogenide of acetic, propionic, butyric, isobutyric, valeric, isovaleric, or caproic acid (e.g.—acetyl chloride) advantageously in the presence of a base, such as pyridine or an alkali salt of the corresponding acid, or also a small quantity of mineral acid, such as sulfuric acid or hydrochloric acid.

Amino groups can be alkylated, for example, by reacting with the corresponding alkyl halogenides, such as methyl, ethyl, propyl, isopropyl, butyl, isobutyl halogenides, or with dimethyl or diethyl sulfate. Furthermore, amino groups can be acylated just like phenolic hydroxy groups with acid halogenides or anhydrides in the presence of bases, such as pyridine. A reduction of the obtained acyl amides, for example with lithium aluminum hydride in ether or tetrahydrofuran, leads to the corresponding monoalkylamines; keto groups in the 4-position, which can be present, can be reduced at the same time.

It is further possible to reduce nitro groups in the 6-, 3'-, and/or 4'-position to amino groups by means of catalytically activated hydrogen or by way of other chemical reducing agents. Suitable as chemical reducing agents are mainly metals, such as iron, zinc, tin, in the presence of acids, such as hydrochloric, sulfuric, or acetic acid and also with the preferable addition of an inert organic solvent. A keto group in the 4-position can be removed by reduction, or can be converted to a hydroxy group. In addition to one-stage processes (catalytic hydrogenation, for example with platinum oxide in glacial acetic acid or ethanol, reaction with aluminum amalgam or with complex hydrides, such as lithium aluminum hydride, in certain cases in the presence of aluminum chloride, or sodium borohydride), it is also possible to use multi-stage methods. Thus, it is possible to convert the keto group into its thioketal, preferably its ethylene thioketal, which can then be split reductively, preferably by reaction with Raney-metals.

It is also possible to convert a keto group in the 4-position into the oxime and to reduce the latter to the corresponding amine in a catalytic or chemical manner. Particularly suitable reducing agents are complex hydrides of the type of the lithium aluminum hydride, whereas Raney-nickel is especially suited as a hydrogenation catalyst. The amine thus obtained can be converted into the 4-hydroxy compound by treating with nitrous acid.

In a compound of Formula I in which

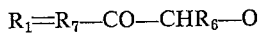

$R_1 = R_7$—CO—CHR$_6$—O the residue $R_7$ can be further converted into another residue $R_7$ by esterification, saponification, amidation, or alkylation. An esterification is carried out in the conventional manner in case of such compounds in which $R_7$ represents a hydroxy group. For example, the reaction can be carried out with methanol, or ethanol, in the presence of acids, preferably in the presence of an organic solvent and with the use of azeotropic esterification methods, or also by treating with diazomethane or diazoethane in ether, tetrahydrofuran, or dioxane.

If the residue $R_7$ represents methoxy or ethoxy, then it can be saponified in accordance with the above-described methods, or it can be converted into the corresponding acid amides by reaction with ammonia or primary and/or secondary alkylamines, and in certain cases cyclic amines. If the residue $R_7$ represents a free amino group, it can be converted into an alkylamino and/or dialkylamino group, which can, if desired, also be cyclic, by reaction with the corresponding alkyl halogenides, such as methyl, ethyl, propyl, isopropyl, butyl, isobutyl, amyl, isoamyl halogenides, or with dimethyl or diethyl sulfate, or with 1,4-dichloro- or 1,4-dibromo-butane, 1,5-dichloro- or 1,5-dibromopentane.

Furthermore, it is possible to introduce a chlorine, bromine, or iodine atom in the 3-position, for example by treating a flavanoid of Formula I ($R_4$=O) which is unsubstituted in the 3-position, with halogenating agents, such as N-chloro- or N-bromo-succinimide, or with free halogen. Such halogenation processes are carried out in the presence of an inert solvent, such as chloroform, carbon tetrachloride, or other halogenated hydrocarbons. It is possible to operate in the cold, at ambient temperature, or at higher temperatures. The reaction can be promoted by irradiation with electromagnetic waves of about the wavelength of light, or by adding suitable catalysts, such as benzoyl peroxide. 3-halo-flavanones are also obtainable by treating 3-hydroxy-flavanones with inorganic acid halogenides, such as thionyl chloride, phosphorus tri- or pentachloride, or bromide.

A hydroxy group in the 3-position can be introduced subsequently by treating flavanones which are unsubstituted in the 3-position with hydrogen peroxide in the presence of ferrous sulfate or with lead tetraacetate in glacial acetic acid. In the latter case, the 3-acetate is produced from which the 3-hydroxy compound can later be obtained by saponification with a mineral acid, for example hydrochloric or sulfuric acid.

The introduction of an amino group into the 3-position is accomplished by reacting a flavanone which is unsubstituted in the 3-position with an ester of nitrous acid so that an isonitroso-ketone is produced, and then reducing the intermediate with, for example, stannous chloride in glacial acetic acid/hydrochloric acid, thereby obtaining 3-amino-flavones.

An amino group in the 3-position can also be introduced by means of the "Neber-reaction." In this case, the starting point is an oxime of a flavanone of Formula I ($R_3$=H, $R_4$=O) which is converted into its arylsulfonyl derivative, preferably by reaction with p-toluene sulfonyl chloride in the presence of pyridine. The arylsulfonyl oxime is converted into a 3-amino-flavanone under the influence of basic catalysts, such as potassium alcoholate and by splitting off the arylsulfonyl group. The conversion is suitably carried out in the presence of a suitable solvent, such as benzene, and at temperatures between 0° C. and room temperature.

An alkyl group, preferably a methyl or ethyl group, can be subsequently introduced into the 3-position by alkylation, preferably methylation or ethylation of a flavane derivative of Formula I unsubstituted in the 3-position. This can be done, for example, by direct reaction of a flavanone with alkyl halogenides, such as methyl or ethyl halogenides, in the presence of a base, or by alkylation of the corresponding enamine with subsequent hydrolysis. Additionally, a 3-methyl group can be introduced into flavones of Formula I by heating the parent flavone compound with paraformaldehyde in glacial acetic acid/hydrochloric acid and subsequent reduction of the produced chloro-methyl group with zinc dust.

It is then possible to convert basic flavanoids of Formula I into their physiologically compatible acid addition salts by treating with acids. For this conversion, such acids are preferably used which yield physiologically compatible and pharmaceutically acceptable salts. Thus, organic and inorganic acids can be used, as for example aliphatic, alicyclic, araliphatic, aromatic, or heterocyclic mono- or polybasic carboxylic or sulfonic acids, such as formic acid, acetic acid, propionic acid, pivalic (trimethylacetic) acid, diethyl acetic acid, oxalic acid, malonic acid, succinic acid, pimelic acid, fumaric (allomaleic) acid, maleic acid, lactic acid, tartaric (dihydroxysuccinic) acid, malic acid, aminocarboxylic acids, sulfamic acid, benzoic acid, salicylic acid, phenylpropinoic acid, citric acid, gluconic acid, ascorbic acid, isonicotinic acid, methane-sulfonic acid, naphthalene-mono- and disulfonic acids, sulfuric acid, nitric acid, hydrohalogenic acids, such as hydrochloric acid or hydrobromic acid, or phosphoric acids, such as orthophosphoric acid.

Finally, flavanoids of Formula I which contain basic groups can also be converted into their physiologically compatible quaternary ammonium compounds by treating with alkylation agents, such as methyl iodide, dimethyl sulfate, or ethyl halogenides.

The preferred groups of compounds which can be obtained in accordance with this invention are as follows:

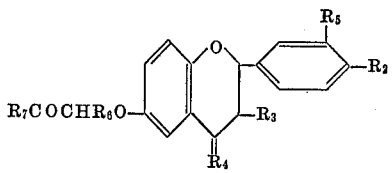

wherein:

$R_6$ represents H or alkyl of 1–5 carbon atoms and
$R_7$ represents OH, alkoxy of 1–6 carbon atoms, $NH_2$, alkylated amino of 1–8 carbon atoms, 2-hydroxy-ethylamino, pyrrolidino, piperidino, or morpholino,
$R_2$ to $R_5$ have the previously indicated meanings, and an additional double bond can be present in the 2,3-position, wherein, however, the residue $R_7COCHR_6$ possesses a total of at most 10 carbon atoms;

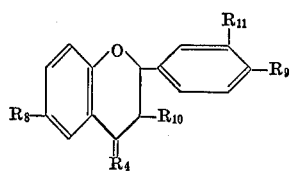

wherein:

$R_8$ represents OH, alkoxy of 1–5 carbon atoms, acyloxy of 1–6 carbon atoms, or $R_7$—CO—$CHR_6$—O—,
$R_9$ represents OH, alkoxy of 1–5 carbon atoms, acyloxy of 1–6 carbon atoms, benzyloxy, dialkylaminoalkoxy of 4–7 carbon atoms, or dialkylamino of 2–4 carbon atoms,
$R_{10}$ represents H, OH, alkyl, or alkoxy of 1–3 carbon atoms,
$R_{11}$ represents H or $CH_3O$,
$R_9$ and $R_{11}$ together can also represent methylene dioxy,
$R_4$, $R_6$, and $R_7$ have the previously indicated meanings, and wherein an additional double bond may be present in the 2,3-position;

Wherein, however, in case $R_{10}$=H and $R_4$=O and no double bond is present in the 2,3-position, $R_{11}$ is $CH_3O$ only if $R_8$ is not simultaneously OH or $CH_3O$ and $R_9$ is not $CH_3O$; and wherein, further, if $R_4$=O and a double bond is present in the 2,3-position, $R_{11}$ is H only if $R_8$ and $R_9$ are not simultaneously both OH or both $CH_3O$ and $R_{10}$ is not H or OH; or if $R_8$ is not simultaneously $C_2H_5O$, $R_9$ is not $C_2H_5O$ or $CH_3O$ and $R_{10}$ is not H; or if $R_8$ and $R_{10}$ are not simultaneously OH and $R_9$ is not $CH_3O$;

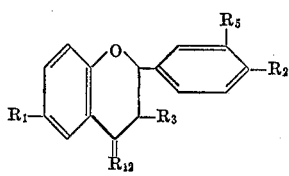

wherein:

$R_{12}$ represents H,OH or H,H or H,$NH_2$ and
$R_1$, $R_2$, $R_3$, and $R_5$ have the previously indicated meanings;

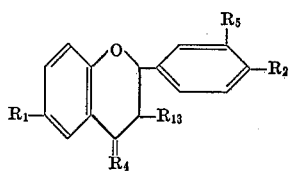

wherein:

$R_{13}$ represents alkyl of 1–3 carbon atoms,
$R_1$, $R_2$, $R_4$, and $R_5$ have the previously indicated meaning, and an additional double bond can be present in the 2,3-position;

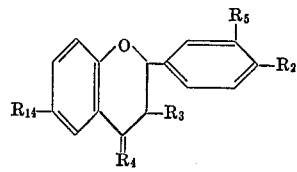

wherein:

$R_{14}$ represents OH, $CH_3O$, acyloxy of 1–6 carbon atoms, or tetrahydropyranyl-(2)-oxy,
$R_2$ to $R_5$ have the previously indicated meanings, and an additional double bond can be present in the 2,3-position, Wherein, however, in case $R_3$=H and $R_4$=O, and no double bond is present in the 2,3-position, $R_5$ is $CH_3O$ only if $R_{14}$ is not simultaneously $CH_3O$ and $R_2$ is not $CH_3O$ or $CH_3OCH_2O$, or if $R_{14}$ is not OH and $R_2$ is not $CH_3O$; and $R_2$ and $R_5$ together represent methylene dioxy only if $R_{14}$ is not simultaneously OH; and $R_5$ represents H only if $R_{14}$ and $R_2$ are not simultaneously both $CH_3O$; and wherein, furthermore, if $R_4$=O and a double bond is present in the 2,3-position, $R_5$ is H only if $R_{14}$ and $R_2$ are not simultaneously both OH or both $CH_3O$ and $R_3$ is not H or OH; or if $R_{14}$ and $R_3$ are not OH and $R_2$ is not $CH_3O$;

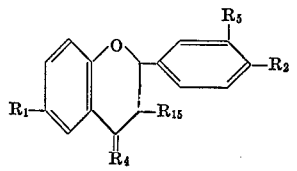

wherein:

$R_{15}$ is alkoxy of 1–3 carbon atoms,
$R_1$, $R_2$, $R_4$, and $R_5$ have the previously indicated meanings, and an additional double bond can be present in the 2,3-position;

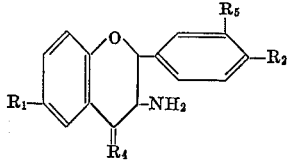

wherein $R_1$, $R_2$, $R_4$, and $R_5$ have the above indicated meanings, and an additional double bond can be present in the 2,3-position;

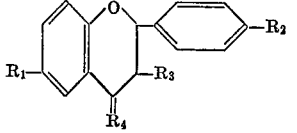

wherein:

$R_1$ to $R_4$ have the previously indicated meanings, and an additional double bond may be present in the 2,3-position;

Wherein, however, if $R_3$=H and $R_4$=O, and no double bond is present in the 2,3-position, $R_2$ is $CH_3O$ only if $R_1$ is neither $CH_3$ nor $NH_2$; and wherein, furthermore, if $R_4$=O and a double bond is present in the 2,3-position, $R_3$ is H only if $R_1$ and $R_2$ are not simultaneously both OH or $CH_3O$ or $C_2H_5O$, or if $R_1$ is not $C_2H_5O$ and $R_2$ is not $CH_3O$; and $R_3$ is OH only if $R_1$ and $R_2$ are not simultaneously both OH or $CH_3O$, or $R_1$ is not OH and $R_2$ is not $CH_3O$;

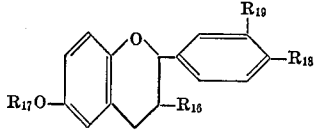

wherein:

$R_{16}$ is H, OH, $CH_3O$, $CH_3$ or $C_2H_5$, $R_{17}$ is H, acyl of 1–6 carbon atoms, alkyl of 1–5 carbon atoms, dialkylaminoalkyl of 4–7 carbon atoms, tetrahydropropyranyl-(2), or the group $R_{20}COCHR_6$—, $R_{18}$ is HO, alkoxy of 1–5 carbon atoms or dialkylaminoalkoxy of 4–7 carbon atoms, and $R_{19}$ is H or $R_{18}$, $R_{20}$ is HO, $CH_3O$, $C_2H_5O$, $NH_2$, or alkylated, if desired cyclic, amino with a total of 1–8 carbon atoms.

Of all the compounds of the invention, the most advantageous are:

3,4'-dimethoxy-6-acetoxy-flavane;
4-amino-6-hydroxy-4'-methoxy-flavane-hydrochloride;
4,4'-dihydroxy-6,3'-dimethoxy-flavane;
4,6-dihydroxy-4'-isoamyloxy-flavane;
3-methyl-6-ethoxy-3',4'-dimethoxy-flavanone;
3-methyl-4,6-dihydroxy-4'-methoxy-flavane;
3-methyl-6-hydroxy-4'-methoxy-flavanone;
3-methyl-6-ethoxy-4'-isoamyloxy-flavanone;
3-methyl-6-hydroxy-4'-isoamyloxy-flavanone;
6,3',4'-trimethoxy-flavanol;
3',4'-methylenedioxy-flavanone-6-oxyacetic acid ethyl ester;
4'-methoxy-flavanone-6-oxyacetic acid ethyl ester;
6-acetoxy-4'-methoxy-flavane;
3-methyl-6-hydroxy-3',4'-dimethoxy-flavanone;
3-methyl-4'-dimethylamino-6-oxyacetic acid ethyl ester;
3,4'-dimethoxy-6-hydroxy-flavane;
6,3'-dimethoxy-4'-hydroxy-flavanone;
6-hydroxy-4'-isoamyloxy-flavanone;
3-methyl-6-hydroxy-4'-methoxy-flavane;
6-hydroxy-4'-methoxy-flavanone.

The following compounds are new and valuable intermediates:

4-oximino-6-hydroxy-4'-methoxy-flavane;
p-Methoxy-propiophenone;
2-hydroxy-5-ethoxy-propiophenone;
3,4-methylenedioxy-propiophenone;
ω-Methoxy-3,4-methylenedioxy-acetophenone;
6,4'-dihydroxy-flavylium chloride;
6-hydroxy-4'-methoxy-flavylium chloride;
6,4'-dimethoxy-flavylium chloride;
6-methoxy-4'-hydroxy-flavylium chloride;
6,3'-dimethoxy-4'-hydroxy-flavylium chloride;
6,3',4'-trihydroxy-flavylium chloride;
3-methyl-6-hydroxy-4'-methoxyflavylium chloride;
6-hydroxy-3,4'-dimethoxy-flavylium chloride;
3-methyl-6-hydroxy-3',4'-methylenedioxy-flavylium chloride;
3-methoxy-6-hydroxy-3',4'-methylenedioxy-flavylium chloride.

The novel flavanoids and also the compounds not subject to the provision first mentioned above can be employed by admixing them with the customary medicinal excipients. Carriers include such organic or inorganic materials which are suitable for parenteral, enteral, or topical application and which do not react with the novel compounds, such as, for example, water, vegetable oils, polyethylene-glycols, gelatins, lactose, amylose, magnesium stearate, talcum, Vaseline, etc. Solutions, preferably oily or aqueous solutions, as well as suspensions, emulsions, or implants serve particularly well for parenteral application. Furthermore, for enteral application, tablets or dragees can be used; and for topical application, there can be employed salves or creams which can, if desired, be sterilized or mixed with auxiliary substances, such as preservatives, stabilizers, wetting agents, or buffers, or salts which influence the osmotic pressure.

The products of the invention are preferably employed in unit dosage form containing about 1 to 500 mg. of active ingredient.

BLOOD CHOLESTEROL LOWERING EFFECT OF FLAVANOIDS

The blood cholesterol lowering effect of the flavanoids was determined according to the method of Counsell et al. (J. Med. Pharm. Chem. 5, 720, 1224 (1962)).

Normally fed rats treated with 25 mg./kg. per os daily of the test substance for a period of 10 days. Thereafter, the animals were sacrificed, the serum cholesterol was determined colorimetrically and compared to that of control animals.

The following (average) results were obtained:

TABLE

| | Cholesterol (mg./100 ml. serum) | |
|---|---|---|
| | Found | Decrease compared to control |
| EXPERIMENT 1 | | |
| 3,4'-dimethoxy-6-acetoxy-flavane | 19.9 | 45.0 |
| 4-amino-6-hydroxy-4'-methoxy-flavane-hydrochloride | 42.1 | 22.8 |
| 4,4'-dihydroxy-6,3'-di-methoxy-flavane | 42.2 | 22.7 |
| 4,6-dihydroxy-4'-isoamyloxy-flavane | 44.4 | 20.5 |
| 3-methyl-6-ethoxy-3',4'-dimethoxy-flavanone | 47.6 | 17.3 |
| 3-methyl-4,6-dihydroxy-4'-methoxy-flavane | 48.0 | 16.9 |
| Control | 64.9 | |
| EXPERIMENT 2 | | |
| 3-methyl-6-hydroxy-4'-methoxy-flavanone | 35.3 | 33.9 |
| 3-methyl-6-ethoxy-4'-isoamyloxy-flavanone | 39.5 | 29.6 |
| 3-methyl-6-hydroxy-4'-isoamyloxy-flavanone | 49.3 | 19.7 |
| 6-hydroxy-3',4'-methylenedioxy-flavanone | 51.0 | 18.2 |
| 6,3',4'-trimethoxy-flavonol | 51.0 | 18.2 |
| Ethyl-3',4'-methylenedioxy-flavanone-6-oxyacetate | 52.7 | 16.5 |
| Control | 69.2 | |
| EXPERIMENT 3 | | |
| Ethyl-4'-methoxy-flavanone-6-oxyacetate | 42.8 | 16.7 |
| Control | 67.5 | |

Thus it is shown that the flavanoids according to the invention have a substantial blood cholesterol lowering effect.

Aside from the pharmacological utility of the compounds of this invention, they all can be used as intermediates to make even more sophisticated final products by substituting different moieties onto the three rings of the flavane system. Such reactions can be conducted in accordance with the teachings herein as well as in the prior art.

Without further elaboration it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

Example 1

1 g. 2-hydroxy-5-methoxy-acetophenone and 1.15 g. p-isoamyloxy-benzaldehyde are dissolved in 8 ml. ethanol, mixed with 5 g. of 50% solution of sodium hydroxide (or potassium hydroxide), and agitated for 5 minutes, the mixture coagulating to a reddish, semi-solid mass. The mixture is then mixed with water; the precipitate is removed by suction, and a recrystallization from ethanol is conducted. The obtained 6-methoxy-4'-isoamyloxy-flavanone melts at 115–116°.

In an analogous manner, the following compounds are obtained by reacting with the correspondingly substituted benzaldehydes:

From 2-hydroxy-5-methoxy-acetophenone:

6-methoxy-4'-isobutoxy-flavanone, M.P. 109–110°
6-methoxy-4'-(2-dimethylaminoethoxy)-flavanone, M.P. 104°
6-methoxy-4'-(3-dimethylaminopropoxy)-flavanone, M.P. 91°
6-methoxy-4'-hydroxy-flavanone, M.P. 178–179°
6-methoxy-4'-benzyloxy-flavanone, M.P. 146–147°

From 2-hydroxy-5-methoxy-propionphenone (obtained by rearrangement of hydroquinone-dipropionate in an aluminum chloride sodium chloride melt and subsequent partial methylation with dimethylsulfate):

3-methyl-6-methoxy-4'-isoamyloxy-flavanone
3-methyl-6-methoxy-4'-isopropoxy-flavanone
3-methyl-6-methoxy-4'-isobutoxy-flavanone
3-methyl-6-methoxy-4'-(2-dimethylaminoethoxy)-flavanone
3-methyl-6-methoxy-4'-(3-dimethylamino-propoxy)-flavanone
3-methyl-6,3'-dimethoxy-4'-isobutoxy-flavanone
3-methyl-6,3'-dimethoxy-4'-isopropoxy-flavanone
3-methyl-6,3'-dimethoxy-4'-(2-dimethylaminoethoxy)-flavanone
3-methyl-6,3'-dimethoxy-4'-(3-dimethylaminopropoxy)-flavanone
3-methyl-6-methoxy-3',4'-propylenedioxy-flavanone
3-methyl-6-methoxy-3',4'-ethylenedioxy-flavanone
3-methyl-6-methoxy-3',4'-methylenedioxy-flavanone From 2,5-dihydroxy-acetophenone: 6-hydroxy-4'-dimethylamino-flavanone (hydrochloride, M.P. 186–188° with decomposition).

From 2,5-dihydroxy-α-methoxy-acetophenone (obtained by treating hydroquinone-bis-methoxy-acetate with aluminum chloride/sodium chloride):

3-methoxy-6-hydroxy-4'-isopropoxy-flavanone
3-methoxy-6-hydroxy-4'-isobutoxy-flavanone
3-methoxy-6-hydroxy-4'-isoamyloxy-flavanone
3-methoxy-6-hydroxy-4'-(2-dimethylaminoethoxy)-flavanone
3-methoxy-6-hydroxy-4'-(2-dimethylaminopropoxy)-flavanone
3-methoxy-6-hydroxy-3',4'-methylenedioxy-flavanone
3-methoxy-6-hydroxy-3',4'-ethylenedioxy-flavanone
3-methoxy-6-hydroxy-3',4'-propylenedioxy-flavanone
3,3'-dimethoxy-6-hydroxy-4'-isopropoxy-flavanone
3,3'-dimethoxy-6-hydroxy-4'-isobutoxy-flavanone
3,3'-dimethoxy-6-hydroxy-4'-isoamyloxy-flavanone
3,3'-dimethoxy-6-hydroxy-4'-(2-dimethylaminoethoxy)-flavanone
3,3'-dimethoxy-6-hydroxy-4'-(3-dimethylaminopropoxy)-flavanone
3,3',4'-trimethoxy-6-hydroxy-flavanone From 2,5-dihydroxy-α-ethoxy-acetophenone: 3-ethoxy-6-hydroxy-4'-isoamyloxy-flavanone.

From the corresponding 2-hydroxy-5-alkoxyacetophenones (obtained by boiling for two hours equimolar quantities of 2,5-dihydroxy-acetophenone, alkyl bromide, and aqueous sodium hydroxide in ethanol):

6-isoamyloxy-4'-methoxy-flavanone, M.P. 90–91°
6-ethoxy-4'-methoxy-flavanone
6-isopropoxy-4'-methoxy-flavanone
6-isobutoxy-4'-methoxy-flavanone
6-(2-dimethylaminoethoxy)-4'-methoxy-flavanone
6-(3-dimethylaminopropoxy)-4'-methoxy-flavanone
6,4'-diisoamyloxy-flavanone
6,4'-diisopropoxy-flavanone
6,4'-diisobutoxy-flavanone
6,4'-bis-(2-dimethylaminoethoxy)-flavanone
6,4'-bis-(3-dimethylaminopropoxy)-flavanone
6-isopropoxy-4'-isobutoxy-flavanone
6-isopropoxy-4'-isoamyloxy-flavanone
6-isopropoxy-4'-(2-dimethylaminoethoxy)-flavanone
6-isopropoxy-4'-(3-dimethylaminopropoxy)-flavanone
6-isobutoxy-4'-isopropoxy-flavanone
6-isobutoxy-4'-isoamyloxy-flavanone
6-isobutoxy-4'-(2-dimethylaminoethoxy)-flavanone
6-isobutoxy-4'-3-dimethylaminopropoxy)-flavanone
6-isoamyloxy-4'-isopropoxy-flavanone
6-isoamyloxy-4'-isobutoxy-flavanone
6-isoamyloxy-4'-(2-dimethylaminoethoxy)-flavanone
6-isoamyloxy-4'-(3-dimethylaminopropoxy)-flavanone
6-(2-dimethylaminoethoxy)-4'-isopropoxy-flavanone
6-(2-dimethylaminoethoxy)-4'-isobutoxy-flavanone
6-(2-dimethylaminoethoxy)-4'-isoamyloxy-flavanone
6-(2-dimethylaminoethoxy)-4'-(3-dimethylaminopropoxy)-flavanone
6-(3-dimethylaminopropoxy)-4'-isopropoxy-flavanone
6-(3-dimethylaminopropoxy)-4'-isobutoxy-flavanone
6-(3-dimethylaminopropoxy)-4'-isoamyloxy-flavanone
6-(3-dimethylaminopropoxy)-4'-(2-dimethylaminoethoxy)-flavanone
6-isoamyloxy-3',4'-dimethoxy-flavanone
6-ethoxy-3',4'-dimethoxy-flavanone
6-isopropoxy-3',4'-dimethoxy-flavanone
6-isobutoxy-3',4'-dimethoxy-flavanone
6-(2-dimethylaminoethoxy)-3',4'-dimethoxy-flavanone
6-(3-dimethylaminopropoxy)-3',4'-dimethoxy-flavanone
6,4'-diisopropoxy-3'-methoxy-flavanone
6,4'-diisobutoxy-3'-methoxy-flavanone
6,4'-diisoamyloxy-3'-methoxy-flavanone
6,4'-bis-(2-dimethylaminoethoxy)-3'-methoxy-flavanone
6,4'-bis(3-dimethylaminopropoxy)-3'-methoxy-flavanone
6-isopropoxy-3'-methoxy-4'-isobutoxy-flavanone
6-isopropoxy-3'-methoxy-4'-isoamyloxy-flavanone
6-isopropoxy-3'-methoxy-4'-(2-dimethylaminoethoxy)-flavanone
6-isopropoxy-3'-methoxy-4'-(3-dimethylaminopropoxy)-flavanone
6-isobutoxy-3'-methoxy-4'-isopropoxy-flavanone
6-isobutoxy-3'-methoxy-4'-isoamyloxy-flavanone
6-isobutoxy-3'-methoxy-4'-(2-dimethylaminoethoxy)-flavanone
6-isobutoxy-3'-methoxy-4'-(3-dimethylaminopropoxy)-flavanone
6-isoamyloxy-3'-methoxy-4'-isopropoxy-flavanone
6-isoamyloxy-3'-methoxy-4'-isobutoxy-flavanone
6-isoamyloxy-3'-methoxy-4'-(2-dimethylaminoethoxy)-flavanone
6-isoamyloxy-3'-methoxy-4'-(3-dimethylaminopropoxy)-flavanone
6-(2-dimethylaminoethoxy)-3'-methoxy-4'-isopropoxy-flavanone
6-(2-dimethylaminoethoxy)-3'-methoxy-4'-isobutoxy-flavanone
6-(2-dimethylaminoethoxy)-3'-methoxy-4'-isoamyloxy-flavanone
6-(2-dimethylaminoethoxy)-3'-methoxy-4'-(3-dimethylaminopropoxy)-flavanone
6-(3-dimethylaminopropoxy)-3'-methoxy-4'-isopropoxy-flavanone
6-(3-dimethylaminopropoxy)-3'-methoxy-4'-isobutoxy-flavanone
6-(3-dimethylaminopropoxy)-3'-methoxy-4'-isoamyloxy-flavanone
6-(3-dimethylaminopropoxy)-3'-methoxy-4'-(2-dimethylaminoethoxy)-flavanone From 2,5-dihydroxy-propiophenone:

3-methyl-6-hydroxy-4'-methoxy-flavanone, M.P. 189–190°
3-methyl-6-hydroxy-4'-dimethylamino-flavanone, M.P. 240° (hydrochloride, M.P. 230° with decomposition)
3-methyl-6-hydroxy-3',4'-dimethoxy-flavanone, M.P. 186–187°
3-methyl-6-hydroxy-3',4'-methylenedioxy-flavanone, M.P. 206–207°
3-methyl-6-hydroxy-3',4'-ethylenedioxy-flavanone
3-methyl-6-hydroxy-3',4'-propylenedioxy-flavanone
3-methyl-6-hydroxy-3'-methoxy-4'-ethoxy-flavanone
3-methyl-6-hydroxy-3'-methoxy-4'-isopropoxy-flavanone
3-methyl-6-hydroxy-3'-methoxy-4'-isobutoxy-flavanone
3-methyl-6-hydroxy-3'-methoxy-4'-isoamyloxy-flavanone
3-methyl-6-hydroxy-3'-methoxy-4'-(2-dimethylaminoethoxy)-flavanone
3-methyl-6-hydroxy-3'-methoxy-4'-(3-dimethylaminopropoxy)-flavanone
3-methyl-6,4'-dihydroxy-3'-methoxy-flavanone From 2-hydroxy-5-ethoxy-propiophenone (obtained from 2,5-dihydroxy-propiophenone and diethylsulfate):

3-methyl-6-ethoxy-4'-isoamyloxy-flavanone, M.P. 119–120°
3-methyl-6-ethoxy-3',4'-dimethoxy-flavanone, M.P. 107–108°
3-methyl-6-ethoxy-3'-methoxy-4'-isoamyloxy-flavanone
3-methyl-6-ethoxy-3'-methoxy-4'-isobutoxy-flavanone
3methyl-6-ethoxy-3'-methoxy-4'-isopropoxy-flavanone
3-methyl-6-ethoxy-3'-methoxy-4'-(2-dimethylaminoethoxy)-flavanone
3-methyl-6-ethoxy-3'-methoxy-4'-(3-dimethylaminopropoxy)-flavanone
3-methyl-6-ethoxy-3',4'-propylenedioxy-flavanone
3-methyl-6-ethoxy-3',4'-ethylenedioxy-flavanone
3-methyl-6-ethoxy-3',4'-methylenedioxy-flavanone Example 2

A solution of 2.4 g. 2,5-dihydroxyacetophenone-5-tetrahydropyranylether (melting point 65–67°, obtained by boiling 2,5-dihydroxy-acetophenone with dihydropyran and a few drops of hydrochloric acid) and 1.9 g. p-isoamyloxybenzaldehyde in 19 ml. ethanol is agitated for 5 minutes with 12 g. of hot 50% sodium hydroxide, is mixed with water, the precipitate is filtered off and recrystallized out of ethanol. The obtained tetrahydropyranyl-(2)-ether of the 6-hydroxy-4'-isoamyloxy-flavanone (melting point 94–95°) is boiled for 2½ hours in 5% aqueous-alcoholic hydrochloric acid, is stirred into water, and the mixture is extracted with chloroform. After the chloroform is evaporated, the raw 6-hydroxy-4'-isoamyloxy-flavanone is recrystallized from ethanol. Melting point: 163–165°.

In analogous manner, the following compounds are obtained:

6-tetrahydropyranyl-(2)-oxy-4'-methoxy-flavanone
6-tetrahydropyranyl-(2)-oxy-4'-ethoxy-flavanone
6-tetrahydropyranyl-(2)-oxy-4'-isopropoxy-flavanone
6-tetrahydropyranyl-(2)-oxy-4'-isobutoxy-flavanone, M.P. 111–112°
6-tetrahydropyranyl-(2)-oxy-4'-(2-dimethylaminoethoxy)-flavanone
6-tetrahydropyranyl-(2)-oxy-4'-(3-dimethylaminopropoxy)-flavanone
6-tetrahydropyranyl-(2)-oxy-4'-benzyloxy-flavanone as well as the 3-methyl derivatives of these compounds.

By treating with aqueous-methanolic hydrochloric acid, the corresponding free phenols are obtained therefrom:

6-hydroxy-4'-methoxy-flavanone, M.P. 184–185°
6-hydroxy-4'-ethoxy-flavanone
6-hydroxy-4'-isopropoxy-flavanone, M.P. 162–163°
6-hydroxy-4'-isobutoxy-flavanone, M.P. 179°
6-hydroxy-4'-(2-dimethylaminoethoxy)-flavanone
6-hydroxy-4'-(3-dimethylaminopropoxy)-flavanone
6-hydroxy-4'-benzyloxy-flavanone, M.P. 198°
3-methyl-6-hydroxy-4'-isopropoxy-flavanone
3-methyl-6-hydroxy-4'-isobutoxy-flavanone
3-methyl-6-hydroxy4'-isoamyloxy-flavanone, M.P. 198–199°
3-methyl-6-hydroxy-4'-(2-dimethylaminoethoxy)-flavanone
3-methyl-6-hydroxy-4'-(3-dimethylaminopropoxy) flavanone If the free 6-hydroxy flavanones are heated with acetic anhydride in pyridine for one hour under reflux, the corresponding 6-acetoxy compounds are obtained. Analogously, the corresponding 6-propionoxy, 6-butyryloxy, 6-valeroyloxy, and 6-caproyloxy compounds are obtainable.

Example 3

1 g. 2'-hydroxy-5'-methoxy-4-isopropoxy-chalcone, obtained by condensttion of 2-hydroxy-5-methoxy-acetophenone with p-isopropoxy-benzaldehyde as in Example 1, but isolated after having been allowed to stand overnight at room temperature, is dissolved in 20 ml. 2n sodium hydroxide, cooled to 0°, mixed with 1 ml. 30% hydrogen peroxide, and allowed to stand for 15 hours at 0°. After another addition of 1 ml. 30% hydrogen peroxide and further 24 hours standing at 0°, the solution is acidified with acetic acid (pH 4), the precipitate is removed by suction, well washed with ether, and the residue which consists of 3-hydroxy-6-methoxy-4'-isopropoxy-flavanone is recrystallized out of methanol.

According to the same method, the following compounds are produced from the corresponding 5'-methoxy-chalcones:

3-hydroxy-6-methoxy-4'-isobutoxy-flavanone
3-hydroxy-6-methoxy-4'-isoamyloxy-flavanone
3-hydroxy-6-methoxy-4'-(2-dimethylaminoethoxy)-flavanone
3-hydroxy-6-methoxy-4'-(3-dimethylaminopropoxy)-flavanone
3-hydroxy-6,3'-dimethoxy-4'-isopropoxy-flavanone
3-hydroxy-6,3',4'-trimethoxy-flavanone
3-hydroxy-6,3'-dimethoxy-4'-ethoxy-flavanone
3-hydroxy-6,3'-dimethoxy-4'-isobutoxy-flavanone
3-hydroxy-6,3'-dimethoxy-4'-isoamyloxy-flavanone
3-hydroxy-6,3'-dimethoxy-4'-(2-dimethylaminoethoxy)-flavanone
3-hydroxy-6,3'-dimethoxy-4'-(3-dimethylaminopropoxy)-flavanone
3-hydroxy-6-methoxy-3',4'-methylenedioxy-flavanone
3-hydroxy-6-methoxy-3',4'-ethylenedioxy-flavanone
3-hydroxy-6-mthoxy-3',4'-propylenedioxy-flavanone From the corresponding 2',5'-dihydroxy-chalcones or 5-tetrahydropyranyl-(2)-oxy-chalcones, the corresponding 3,6-dihydroxy-flavanones, substituted in the 4'- or the 3',4'-position, are obtained.

Example 4

2 g. 2-hydroxy-5-methoxy-acetophenone and 1.8 g. 3-methoxy-4-hydroxy-benzaldehyde are dissolved in 38 ml. ethanol and mixed, dropwise, with a solution of 20 g. potassium hydroxide in 14 ml. water. After briefly heating to 40–50°, the mixture is kept standing for 2 days under nitrogen, then stirred into water, acidified with dilute hydrochloric acid, and extracted with chloroform. The solvent is distilled off in vacuum; the residue is dissolved in 13 ml. ethanol, is mixed with 3.3 ml. water and 1.3 g. sodium acetate and heated for 2 hours on a steam bath. Then, it is stirred into water, extracted by ether, and the extract is washed with water and dried over sodium sulfate. After the ether is removed, the residue is recrystallized out of methanol. The obtained 6,3'-dimethoxy-4'-hydroxy-flavanone melts at 149–150°.

In an analogous manner, the following compounds are produced:

6,3'-dimethoxy-4'-ethoxy-flavanone, M.P. 154°
6-hydroxy-3'-methoxy-4'-ethoxy-flavanone, M.P. 184–186°
6-methoxy-3',4'-methylenedioxy-flavanone, M.P. 140–141°
6,4'-dihydroxy-3'-methoxy-flavanone, M.P. 212–214°
6-hydroxy-3',4'-ethylenedioxy-flavanone
6-hydroxy-3',4'-propylenedioxy-flavanone
6-methoxy-3',4'-propylenedioxy-flavanone
6-methoxy-3',4'-ethylenedioxy-flavanone
6,3'-dimethoxy-4'-isopropoxy-flavanone
6,3'-dimethoxy-4'-isobutoxy-flavanone
6,3'-dimethoxy-4'-isoamyloxy-flavanone
6,3'-dimethoxy-4'-(2-dimethylaminoethoxy)-flavanone
6,3'-dimethoxy-4'-(3-dimethylaminopropoxy)-flavanone
6-hydroxy-3'-methoxy-4'-isopropoxy-flavanone
6-hydroxy-3'-methoxy-4'-isobutoxy-flavanone
6-hydroxy-3'-methoxy-4'-isoamyloxy-flavanone 6-hydroxy-3'-methoxy-4'-(2-dimethylaminoethoxy)-
  flavanone
6-hydroxy-3'-methoxy-4'-(3-dimethylaminopropoxy)-
  flavanone Example 5

A hot ethanolic solution of 2.6 g. 2-hydroxy-5-acetamido-acetophenone and 2.4 g. p-isopropoxy-benzaldehyde is mixed with 8 ml. piperidine and allowed to stand for 6 days at 25°. Then, the mixture is stirred into water, the 6-acetamido-4'-isopropoxy-flavanone obtained thereby removed by suction, washed with water, and recrystallized out of ethanol.

In an analogous manner, the following compounds are produced:

6-acetamido-4'-isobutoxy-flavanone
6-acetamido-4'-isoamyloxy-flavanone
6-acetamido-4'-(2-dimethylaminoethoxy)-flavanone
6-acetamido-4'-(3-dimethylaminopropoxy)-flavanone
6-acetamido-3'-methoxy-4'-isopropoxy-flavanone
6-acetamido-3'-methoxy-4'-isoamyloxy-flavanone
6-acetamido-3'-methoxy-4'-(2-dimethylaminoethoxy)-
  flavanone
6-acetamido-3',4'-ethylenedioxy-flavanone
6-acetamido-3',4'-propylenedioxy-flavanone By 8 hours boiling of these compounds with 10% methanolic hydrochloric acid, the hydrochlorides of the corresponding 6-amino compounds are produced.

The starting substance, 2-hydroxy-5-acetamido-acetophenone, can be obtained from p-hydroxy-acetanilide which is converted, by boiling with acetyl chloride in benzene in the presence of pyridine, into the acetate, and is subsequently rearranged by three hours heating with aluminum chloride at 140–160°.

If, as starting materials, 2-hydroxy-5-nitroacetophenone and 3-nitro-4-isopropoxy-benzaldehyde (produced by alkylation of 3-nitro-4-hydroxy-benzaldehyde) are used, the 6,3'-dinitro-4'-isopropoxy-flavanone is obtained.

In an analogous manner, the following compounds are obtainable.

6,3'-dinitro-4'-ethoxy-flavanone
6,3-dinitro-4'-isobutoxy-flavanone
6,3'-dinitro-4'-isoamyloxy-flavanone
6,3'-dinitro-4'-(2-dimethylaminoethoxy)-flavanone
6,3'-dinitro-4'-(3-dimethylaminopropoxy)-flavanone If 2,5-dihydroxy-butyrophenone (obtained from hydroquinone-dibutyrate by melting with aluminum chloride/sodium chloride) is used as starting substance, the following compounds can be obtained:

3-ethyl-6,4'-dihydroxy-flavanone
3-ethyl-6-hydroxy-4'-methoxy-flavanone
3-ethyl-6-hydroxy-4'-ethoxy-flavanone
3-ethyl-6-hydroxy-4'-isopropoxy-flavanone
3-ethyl-6-hydroxy-4'-isobutoxy-flavanone
3-ethyl-6-hydroxy-4'-isoamyloxy-flavanone
3-ethyl-6-hydroxy-3',4'-dimethoxy-flavanone
3-ethyl-6-hydroxy-3'-methoxy-4'-ethoxy-flavanone
3-ethyl-6-hydroxy-3'-methoxy-4'-isopropoxy-flavanone
3-ethyl-6-hydroxy-3'-methoxy-4'-isobutoxy-flavanone
3-ethyl-6-hydroxy-3'-methoxy-4'-isoamyloxy-flavanone
3-ethyl-6-hydroxy-3'-methoxy-4'-(2-dimethylamino-
  ethoxy)-flavanone
3-ethyl-6-hydroxy-3'-methoxy-4'-(3-dimethylamino-
  propoxy)-flavanone
3-ethyl-6-hydroxy-3',4'-methylenedioxy-flavanone
3-ethyl-6-hydroxy-3',4'-ethylenedioxy-flavanone
3-ethyl-6-hydroxy-3',4'-propylenedioxy-flavanone When using 2-hydroxy-5-methoxy-butyrophenone, the corresponding 6-methoxy-flavanones are obtained.

Example 6

1.5 g. 2'-hydroxy-4,5'-dinitro-chalcone (obtained by condensation of p-nitrobenzaldehyde with 2-hydroxy-5-nitroacetophenone) are heated in 70 ml. ethanol together with 0.5 g. camphor sulfonic acid in a bomb (Carius tube) for 2 hours at 130°. During the cooling of the reaction mixture, 6,4'-dinitro-flavanone separates which is removed by suction and recrystallized out of ethanol.

If as the starting substance 2'-hydroxy-3,5'-dinitro-4-methoxy-chalcone (obtained from 3-nitroanisaldehyde) is used, 6,3'-dinitro-4'-methoxy-flavanone is obtained.

Example 7

2 g. 1-p-anisyl-3-(2'-hydroxy-5'-methoxyphenyl)-propanol are heated to the boiling point in 10 ml. 2% methanolic hydrochloric acid for 4 hours. Subsequently, the reaction mixture is concentrated under decreased pressure, 6,4'-dimethoxy-flavane being crystallized; melting point 91–92°.

In an analogous manner, 6-n-amyloxy-4'-methoxy-flavane can be obtained.

Example 8

2 g. 1-(4'-hydroxyphenyl)-3-(2',5'-dimethoxyphenyl)-propanol are boiled with a 5% solution of hydrogen bromide in 50 ml. glacial acetic acid for 2 hours under reflux conditions. Then, the mixture is poured into water, extracted with chloroform, the extract washed with water, dried over sodium sulfate, and evaporated to form a dry substance, 6,4'-dihydroxy flavane being obtained.

Example 9

2 g. 1-p-anisyl-3-(2'-hydroxy-5'-methoxyphenyl)-propylchloride are dissolved in the cold state in 200 ml. of a 5% solution of sodium hydroxide and is subsequently heated on a steam bath, thereby crystallizing out 6,4'-dimethyl-flavane. M.P. 91–92°.

Example 10

1 g. 2'-hydroxy-5'-methoxy-4 - isoamyloxy-chalcone (M.P. 88°; obtained from 2-hydroxy-5-methoxy-acetophenone and p-isoamyl-oxybenzaldehyde) is boiled for 5 hours with 1 g. selenium dioxide in 30 ml. of isoamyl alcohol. The precipitated selenium is filtered off and washed with hot ethanol. After steam distillation of the filtrate, the temperature is lowered, the precipitate is removed by suction, dried, and extracted with chloroform. After the chloroform is distilled off, the obtained 6-methoxy-4'-isoamyloxy-flavone is recrystallized out of ethanol; M.P. 159–160°.

In a analogous manner, the following compounds are obtained:

6-methoxy-4'-isopropoxy-flavone, M.P. 108–109°
6-methoxy-4'-n-propoxy-flavone
6-methoxy-4'-n-butoxy-flavone
6-methoxy-4'-sec. butoxy-flavone
6-methoxy-4'-isobutoxy-flavone
6-methoxy-4'-n-amyloxy-flavone
6-methoxy-4'n-hexyloxy-flavone
6-methoxy-4'-isohexyloxy-flavone
6-methoxy-4'-heptyloxy-flavone
6-methoxy-4'-octyloxy-flavone
6-methoxy-4'-nonyloxy-flavone
6-methoxy-4'-decyloxy-flavone
6-methoxy-4'-benzyloxy-flavone, M.P. 162–163°
6-methoxy-4'-(2-dimethylaminoethoxy)-flavone
6-methoxy-4'-(3-dimethylaminopropoxy)-flavone, M.P. 109–110°
6,3'-dimethoxy-4'-benzyloxy-flavone
6,4'-dinitro-flavone Example 11

1 g. 2'-hydroxy-5'-methoxy-4-isoamyloxy-chalcone is dissolved in 40 ml. ethanol. After the addition of 40 ml. 5% solution of sodium hydroxide, the mixture is cooled to 0°; then, 10 ml. 16.5% hydrogen peroxide is added and kept at 0° for 2 hours. After having been allowed to stand at room temperature for 18 hours, the reaction mixture is mixed with a mixture of dilute hydrochloric acid and ice, the precipitated 6-methoxy-4'-isoamyloxy-flavonol filtered off, washed with water, and recrystallized out of ethyl acetate. M.P. 144–145°.

In an analogous manner, the following compounds are produced from the corresponding 5'-methoxy-chalcones:

6-methoxy-4'-n-propoxy-flavonol
6-methoxy-4'-isopropoxy-flavonol
6-methoxy-4'-n-butoxy-flavonol
6-methoxy-4'-sec. butoxy-flavonol
6-methoxy-4'-isobutoxy-flavonol
6-methoxy-4'-n-amyloxy-flavonol
6-methoxy-4'-n-hexyloxy-flavonol
6-methoxy-4'-isohexyloxy-flavonol
6-methoxy-4'-heptyloxy-flavonol
6-methoxy-4'-octyloxy-flavonol
6-methoxy-4'-nonyloxy-flavonol
6-methoxy-4'-decyloxy-flavonol
6-methoxy-4'-benzyloxy-flavonol, M.P. 190–191°

From the tetrahydropyranyl ethers of the corresponding 5'-hydroxy-chalcones, the following compounds are obtained:

6-hydroxy-4'-n-propoxy-flavonol
6-hydroxy-4'-isopropoxy-flavonol
6-hydroxy-4'-n-butoxy-flavonol
6-hydroxy-4'-sec. butoxy-flavonol
6-hydroxy-4'-isobutoxy-flavonol
6-hydroxy-4'-n-amyloxy-flavonol
6-hydroxy-4'-isoamyloxy-flavonol
6-hydroxy-4'-n-hexyloxy-flavonol
6-hydroxy-4'-isohexyloxy-flavonol
6-hydroxy-4'-heptyloxy-flavonol
6-hydroxy-4'-octyloxy-flavonol
6-hydroxy-4'-nonyloxy-flavonol
6-hydroxy-4'-decyloxy-flavonol
6-hydroxy-4'-benzyloxy-flavonol Example 12

3 g. 2-hydroxy-5-methoxy-propiophenone are boiled for 16 hours in 150 ml. of absolute acetone with 4.5 g. p-isopropoxy benzoic acid chloride and 15 g. anhydrous potassium carbonate. The acetone is distilled off in vacuum; the residue is mixed with water and shaken out by ether. After drying, the ether is eliminated, and the residue is dissolved in 15 ml. dry pyridine at 50° and mixed, under stirring, with 1.4 g. ground potassium hydroxide. After 30 minutes, the reaction mixture is acidified with 10% acetic acid, the separated oil phase is extracted with chloroform and dried over sodium sulfate. The obtained crude product is dissolved in 11 ml. glacial acetic acid, mixed with 0.35 ml. concentrated sulfuric acid and heated on the steam bath for one hour. The mixture is stirred into ice water; the precipitated 3-methyl-6-methoxy-4'-isopropoxy-flavone is removed by suction, washed with water, and recrystallized out of methanol.

In an analogous manner, the following compounds are produced:

3-methyl-6,4'-dimethoxy-flavone
3-methyl-6-methoxy-4'-ethoxy-flavone
3-methyl-6-methoxy-4'-isobutoxy-flavone
3-methyl-6-methoxy-4'-isoamyloxy-flavone If, in place of 2-hydroxy-5-methoxy-propiophenone, the 5-tetrahydropyranyl ether of the 2,5-dihydroxypropiophenone is used, the following compounds are analogously obtained:

3-methyl-6-hydroxy-4'-methoxy-flavone
3-methyl-6-hydroxy-4'-ethoxy-flavone
3-methyl-6-hydroxy-4'-isopropoxy-flavone
3-methyl-6-hydroxy-4'-isobutoxy-flavone
3-methyl-6-hydroxy-4'-isoamyloxy-flavone Starting from 2-hydroxy-α.5-dimethoxyacetophenone, the following compounds are obtained:

3,6-dimethoxy-4'-ethoxy-flavone
3,6-dimethoxy-4'-isopropoxy-flavone
3,6-dimethoxy-4'-isobutoxy-flavone
3,6-dimethoxy-4'-isoamyloxy-flavone
3,6-dimethoxy-4'-benzyloxy-flavone Example 13

From 2-hydroxy-5-methoxy-acetophenone and p-benzyloxybenzoyl-chloride, 6-methoxy-4'-benzyloxy-flavone is produced, analogously to Example 12, melting point: 162–163°.

1.5 g. 6-methoxy-4'-benzyloxy-flavone are suspended in 50 ml. glacial acetic acid and 50 ml. concentrated hydrochloric acid and heated on the steam bath for 1 hour. The solvent is distilled off in vacuum and the crude 6-methoxy-4'-hydroxy-flavone is mixed with water, filtered off, washed, and, in the moist state, recrystallized from ethanol, M.P. 226°.

Into 25 ml. absolute acetone 2.7 g. 6-methoxy-4'-hydroxy-flavone, 2.6 g. 1-chloro-3-dimethylaminopropane, and 5.6 g. anhydrous potassium carbonate are added and boiled, with stirring, for 24 hours. The mixture is filtered in the hot state, the filtrate is concentrated by boiling, and the residue is mixed with water. The crude 6-methoxy-4'-(3-dimethylaminopropoxy)-flavone is removed by suction and recrystallized out of ethanol; M.P. 109–110°.

In an analogous manner, the following compounds are produced:

6-methoxy-4'-(2-dimethylaminoethoxy)-flavone
3,6-dimethoxy-4'-(2-dimethylaminoethoxy)-flavone
3,6-dimethoxy-4'-(3-dimethylaminopropoxy)-flavone Analogously, 6,3'-dimethoxy-4'-benzyloxy-flavone is converted to 6,3'-dimethoxy-4'-hydroxy-flavone and the latter to 6,3'-dimethoxy-4'-(3-dimethyl-aminopropoxy)-flavone.

Example 14

A hot, alcoholic solution of 3 g. 4-isopropoxy-2'-acetoxy-5'-methoxy-chalcone-dibromide (obtained by bromination of the 4-isopropoxy-2'-acetoxy-5'-methoxy-chalcone in absolute chloroform) is mixed, under stirring, with 0.1 n solution of sodium hydroxide. After a few minutes, the mixture is cooled, the precipitate is filtered off and recrystallized out of ethanol. The obtained 6-methoxy-4'-isopropoxy-flavone melts at 108–109°.

Example 15

1 g. 2-hydroxy-5-isobutoxy-ω-methoxy-acetophenone (obtained from hydroquinone-mono-isobutyl ether and methoxyacetonitrile in ether under the effect of zinc chloride/hydrogen), 1.8 g. p-methoxy-benzoic acid anhydride and 0.85 g. potassium-p-methoxybenzoate are finely ground together and heated for 3 hours under a pressure of 13 mm. Hg. to 180°. The reaction mixture is comminuted after cooling and boiled for 15 minutes with 30 ml. of 8% aqueous ethanolic potassium hydroxide solution. The ethanol is removed in vacuum, 100 ml. water are added, and the separated precipitate is filtered off. Recrystallization out of ethanol results in 3,4'-dimethoxy-6-isobutoxy-flavone.

Analogously, other 6,3',4' and 3,6,4'-trialkoxy and 6,4'-dialkoxy-flavones are obtained.

Example 16

4. g. hydroquinone, 8 g. p-methoxycinnamylbromide, and 5 g. freshly molten zinc chloride are boiled for 6 hours in 35 ml. absolute benzene. Then, the mixture is cooled off, the organic phase is washed with water, dried over sodium sulfate, and the solvent is removed under reduced pressure. The crude product is chromatographed at 20 g. aluminum oxide, 6-hydroxy-4'-methoxy-flavane being obtained thereby.

Analogously, if hydroquinone-mono-tert. butyl ether is used in place of hydroquinone, 6-tert. butoxy-4'-methoxy-flavane is obtained.

Example 17

3 g. 3-p-anisyl-3-p-anisyloxy-propylchloride and 0.3 g. tin tetrachloride are heated in the bomb (carius tube) for 6 hours to 200°. After cooling, the mixture is worked up with ether and aqueous hydrochloric acid; the ether phase is washed with a soda solution; drying is carried out over sodium sulfate; the solvent is distilled off; and the crude product is recrystallized from methanol, 6,4'-dimethoxyflavane of a melting point of 91–92° being obtained.

Example 18

3 g. 3-p-anisyl-3-p-anisyloxy-propanol are heated with 0.3 g. zinc chloride in the bomb tube for 30 minutes to 200° and, after cooling, the mixture is worked up as in the previous example, 6,4'-dimethoxy-flavane being obtained; M.P. 91–92°.

Example 19

2 g. hydroquinone-mono-isopropyl ether and 2.1 g. p-methoxy-benzoyl acetic acid ethyl ester (obtained by the effect of sodium upon a mixture of p-methoxybenzoic acid ethyl ester and acetic acid ethyl ester) are mixed, in portions, with 3 g. phosphorus pentoxide and subsequently heated on the steam bath for 2 hours. Then the mixture is cooled, again the same quantity of p-methoxybenzoyl acetic acid ethyl ester and phosphorus pentoxide is added, and another 2 hours heating is carried out. The reaction product is mixed with water; the phosphoric acid is almost neutralized with a solution of sodium hydroxide, the mixture is saturated with sodium chloride and extracted with chloroform. The extract is washed with a sodium bicarbonate solution, is dried over sodium sulfate, and is evaporated to dryness. The 6-isopropoxy-4'-methoxy-flavone remaining is recrystallized out of ethanol.

In an analogous manner, the following compounds are obtainable:

6-ethoxy-4'-isopropoxy-flavone
6-ethoxy-4'-isobutoxy-flavone
6-ethoxy-4'-isoamyloxy-flavone
6-isopropoxy-4'-ethoxy-flavone
6-isopropoxy-4'-isobutoxy-flavone
6-isopropoxy-4'-isoamyloxy-flavone

Example 20

2 g. 6-hydroxy-4'-methoxy-flavylium chloride are stirred for 30 minutes at room temperature in 100 ml. absolute ether with 1.6 g. lithium aluminum hydride.

There is obtained 6-hydroxy-4'-methoxy-2-flavene, having a melting point of 183° (from methanol/ether).

In an analogous manner, there is produced: 6,4'-dimethoxy-2-flavene, M.P. 148–150°.

Example 21

1 g. platinum dioxide is pre-hydrogenated in 150 ml. methanol and is then mixed with 4 g. 6,4'-dimethoxy-flavylium-chloride. The hydrogenation is further continued until 2 mols of hydrogen have been absorbed; then, the mixture is filtered, the methanol is distilled off, and the produced 6,4'-dimethoxy-flavane is recrystallized from methanol after being purified by activated carbon, M.P. 91–92°.

Analogously, the following compounds are obtainable:

6-hydroxy-4'-methoxy-flavane
6-methoxy-4'-hydroxy-flavane
4'-hydroxy-6,3'-dimethoxy-flavane
6,3',4'-trihydroxy-flavane, as well as
6-hydroxy-3,4'-dimethoxy-flavane From 3-methyl-6-hydroxy - 4 - benzyloxy-flavylium-chloride, analogously the 3-methyl-6,4'-dihydroxy-flavane is obtained which is converted with acetic anhydride/pyridine into 3-methyl-6,4'-diacetoxy-flavane, M.P. 165–166° (from methanol).

Example 22

3.1 g. 6-methoxy-4'-isopropoxy-flavone are hydrogenated in 70 ml. ethanol with 5 g. Raney-nickel as the catalyst for 12 hours at 85°. The catalyst is filtered off, the solvent is distilled off, and the residue is chromatographed through neutral aluminum oxide. The elution with chloroform results in 6-methoxy-4'-isopropoxy-flavanone and 4-hydroxy - 6 - methoxy-4'-isopropoxy flavane, in addition to unchanged starting substance.

Example 23

1.1 g. 6-hydroxy-4'-isoamyloxy-flavone and 0.4 g. 5% palladium charcoal are heated in 40 ml. tetralin for 2 hours to 200°. Then the mixture is cooled, the catalyst is filtered off, the extract is washed three times with a little ether and is acidified. During this process, 6-hydroxy-4'-isoamyloxy-flavanone is precipitated and is recrystallized out of aqueous ethanol, M.P. 163–165°.

Example 24

1.1 g. 3,6-dihydroxy-3'-methoxy-4'-isopropoxy-flavone and 8.5 g. sodium carbonate are introduced into 100 ml. boiling water under nitrogen. Under stirring, 20 g. sodium dithionite are added. After 30 minutes, the mixture is cooled to 0°, and after adding 15 ml. concentrated hydrochloric acid, the mixture is allowed to stand for 3 hours at 0°. The separated, unchanged flavonol is filtered off, the filtrate is thoroughly extracted with ethyl acetate, the extract is dried over sodium sulfate, is concentrated to a dry product, and the obtained 3,6-dihydroxy-3'-methoxy-4'-isopropoxy-flavanone is recrystallized out of aqueous ethanol.

In an analogous manner, other 3,6-dihydroxy-flavanones are obtainable.

Example 25

2 g. 6,3'-dimethoxy-4'-hydroxy-flavanone in 80 ml. absolute ether and 30 ml. absolute tetrahydrofuran are added, dropwise, to a suspension of 0.4 g. lithium aluminum hydride in 40 ml. absolute ether, this being done within 30 minutes. After boiling for ½ hour, the excess hydride is decomposed with ethyl acetate, and subsequently mixed with very dilute hydrochloric acid. The organic phase is separated, washed, and dried, and the ether is evaporated. There is obtained 4,4'-dihydroxy-6,3'-dimethoxy-flavane having a melting point of 146–148°.

In an analogous manner, the following compounds are produced:

4-hydroxy-6-methoxy-3',4'-methylenedioxy-flavane,
  M.P. 140–141°
3-methyl-4-hydroxy-6-ethoxy-4'-isoamyloxy-flavane,
  M.P. 188°
3-methyl-4,6-dihydroxy-4'-methoxy-flavane,
  M.P. 222–223°
3-methyl-4,6-dihydroxy-4'-isoamyloxy-flavane,
  M.P. 162–163°
4,6-dihydroxy-3',4'-dimethoxy-flavane, M.P. 213–214°
4,6-dihydroxy-3'-methoxy-4'-isoamyloxy-flavane
4-hydroxy-6,3'-dimethoxy-4'-isoamyloxy-flavane
4-hydroxy-6,3'-dimethoxy-4'-isobutoxy-flavane
4-hydroxy-6,3'-dimethoxy-4'-(2-dimethylaminoethoxy)-
  flavane
4-hydroxy-6-methoxy-3',4'-ethylenedioxy-flavane
4-hydroxy-6-methoxy-3',4'-propylenedioxy-flavane

Example 26

A mixture of 1 g. 6-methoxy-4'-isobutoxy-flavanone and 0.3 g. sodium borohydride in 30 ml. ethanol is stirred for 10 hours at room temperature, is thereafter acidified with a little acetic acid and is concentrated under vacuum. The 4-hydroxy-6-methoxy-4'-isobutoxy-flavane which precipitates during this process is recrystallized out of methanol.

In an analogous manner, the following compounds can be produced:

4-hydroxy-6-methoxy-4'-isopropoxy-flavane
4-hydroxy-6-methoxy-4'-isoamyloxy-flavane
4-hydroxy-6-methoxy-4'-(2-dimethylaminoethoxy)-flavane
4-hydroxy-6-methoxy-4'-(3-dimethylaminopropoxy)-flavane

Example 27

1 g. 6,3',4'-trimethoxy-flavanone and aluminum amalgam (from 3 g. aluminum foil) are boiled for 6 hours in 100 ml. 80% ethanol. The catalyst is filtered off and the solution is concentrated under vacuum, the 4-hydroxy-6,3',4'-trimethoxy-flavane being crystallized out of this solution.

Analogously, other 4-hydroxy-flavanes are obtainable, for example, the 4-hydroxy-6-methoxy-4'-isoamyloxy-flavane.

Example 28

A solution of 1.5 g. 6-methoxy-4'-isoamyloxy-flavanone in 2 ml. ethane dithiol and 2 ml. boron trifluoride etherate is allowed to stand for 15 minutes at room temperature, and then, after adding 20 ml. chloroform, it is allowed to stand overnight. The reaction mixture is poured into 200 ml. chloroform, is washed with water and sodium chloride solution and is dried over sodium sulfate. The residue obtained after the chloroform is removed, is dissolved in 300 ml. absolute ethanol and is boiled for 10 hours with active Raney-nickel. After the catalyst is filtered off, the solution is concentrated. During this process, the 6-methoxy-4'-isoamyloxy-flavane is precipitated. It is recrystallized out of methanol.

In an analogous manner, the following compounds are obtained:

6-methoxy-4'-isopropoxy-flavane
6-methoxy-4'-isobutoxy-flavane
6-methoxy-4'-(2-dimethylaminoethoxy)-flavane
6-methoxy-4'-(3-dimethylaminopropoxy)-flavane
6-methoxy-3',4'-methylenedioxy-flavane
6-methoxy-3',4'-ethylenedioxy-flavane
3-methyl-6-methoxy-3',4'-ethylenedioxy-flavane
3-methyl-6-methoxy-3',4'-methylenedioxy-flavane
3-methyl-6-methoxy-3',4'-propylenedioxy-flavane
3-methyl-6-methoxy-3'-methoxy-4'-isoamyloxy-flavane
3-methyl-6-methoxy-3'-methoxy-4'-isobutoxy-flavane
3-methyl-6,3'-4'-trimethoxy-flavane
3-methyl-6-hydroxy-4'-methoxy-flavane
6-hydroxy-4'-isopropoxy-flavane
6-hydroxy-4'-isoamyloxy-flavane
6-formyloxy-4'-(3-dimethylaminopropoxy)-flavane

Example 29

2.6 g. 6,4'-dimethoxy-flavanone are hydrogenated with platinum dioxide, in 250 ml. absolute dioxane, at room temperature and normal pressure to form 4-hydroxy-6,4'-dimethoxy-flavane; M.P. 148–150° (from ethanol).

In an analogous manner, the following compounds can be hydrogenated:

6-hydroxy-4'-methoxy-flavanone to 4,6-dihydroxy-4'-methoxy-flavane, M.P. 183–184°
6-hydroxy-4'-isoamyloxy-flavanone to 4,6-dihydroxy-4'-isoamyloxy-flavane, M.P. 162–163°

Example 30

Ice cold tetrahydrofuran is saturated with diborane, then mixed with 1.5 g. 6,3'-dimethoxy-4'-ethoxy-flavanone. The mixture is allowed to stand for 24 hours at room temperature. The excess diborane is destroyed by the addition of 3 ml. acetic acid and the solvent is distilled off. The residue is mixed with water, is extracted with ether, and is washed with an aqueous sodium bicarbonate solution. From the ether solution there is obtained 6,3'-dimethoxy-4'-ethoxy-flavane which is then recrystallized from benzene.

In an analogous manner, the following compounds are obtainable:

3,6,4'-trimethoxy-flavane
6,3'-dimethoxy-4'-isoamyloxy-flavane
6,3'-dimethoxy-4'-(2-dimethylaminoethoxy)-flavane
6,3'-dimethoxy-4'-(3-dimethylaminopropoxy)-flavane

Example 31

2 g. 6-hydroxy-4'-methoxy-2-flavene are hydrogenated in the presence of 500 mg. Raney-nickel in 15 ml. ethanol. After absorption of 1 mol hydrogen, the catalyst is filtered off and the solvent is removed under reduced pressure, 6-hydroxy-4'-methoxy-flavane being obtained.

In an analogous manner, the following compounds can be obtained:

6-(2-dimethylaminoethoxy)-3',4'-di-n-propoxy-flavane
6-hydroxy-3'-(2-methylethylaminoethoxy)-flavane
6-hydroxy-3'-(3-methylethylaminopropoxy)-flavane
6-hydroxy-4'-sec. butoxy-flavane
6-hydroxy-4'-n-butoxy-flavane Analogously, 3,4'-dimethoxy-6-hydroxy-3-flavene (produced from the corresponding flavylium chloride with lithium aluminum hydride) is hydrogenated to form 3,4'-dimethoxy-6-hydroxy-flavane. Likewise, the following compounds are obtained from the corresponding 3-flavenes:

3-methoxy-6-hydroxy-4'-n-amyloxy-flavane
3-methoxy-6-hydroxy-4'-(2-methylethylaminoethoxy)-flavane
3-hydroxy-4'-methoxy-flavane-6-oxy-acetic acid.

Example 32

2,4 g. 3-methyl-4-hydroxy-6-tetrahydropyranyloxy-4'-ethoxy-flavane is dissolved in 100 ml. dioxane, is mixed with 1.2 g. palladium chloride, and hydrogenated at room temperature. After the calculated quantity of hydrogen has been absorbed, the catalyst is filtered off, the dioxane solution is concentrated under reduced pressure, diluted with water and, for removing the remaining dioxane, is again concentrated. The crude product is recrystallized from ethanol, 3-methyl-6-tetrahydropyranyloxy-4'-ethoxy-flavane being obtained.

Analogously, 4-hydroxy-6-valeryloxy-4' - (3 - diethylaminopropoxy)-2-flavene is hydrogenated to form 6-valeryloxy-4'-(3-diethylaminopropoxy)-flavane.

Analogously, the following compounds are obtainable from the corresponding 4-hydroxy-flavanes or 4-hydroxy-2-flavenes:

3-methyl-6-butyryloxy-4'-methoxy-flavane
3-methyl-6-isobutyryloxy-4'-methoxy-flavane
3-methyl-6-ethoxy-4'-isoamyloxy-flavane
6-(2-methylethylaminoethoxy)-4'-(3-methylethylaminopropoxy)-flavane
6-hydroxy-3',4'-propylenedioxy-flavane

Example 33

2 g. 6-n-butoxy-4'-(2-diethylaminoethoxy)-flavonol are hydrogenated with 0.5 g. Raney-nickel in 30 ml. ethanol at 120° under a pressure of 40 atmospheres of hydrogen. After cooling, the catalyst is filtered off and the filtrate is concentrated until the 3-hydroxy-6-n-butoxy-4'-(2-diethylaminoethoxy)-flavane is crystallized.

In an analogous manner, the following compounds can be created:

3,4'-dihydroxy-6-methoxy-flavane
3-hydroxy-6-methoxy-4'-isoamyloxy-flavane
3-hydroxy-6 sec. butoxy-3'-(2-dimethylaminoethoxy)-flavane

Example 34

5 g. 6-acetoxy-4'-isoamyloxy-flavanone and 0.1 g. benzoyl peroxide are dissolved in 40 ml. chloroform and added to a boiling solution of 3 g. N-bromo-succinimide in 30 ml. chloroform. After 4 hours boiling, the chloroform is distilled off, the residue is dissolved in 70 ml. ethanol, mixed with 50 ml. 20% aqueous potassium carbonate solution, and boiled for 30 minutes. Then, the solution is weakly acidified (pH 6.5), the ethanol is distilled off, the residue is mixed with water and extracted with chloroform. After the solvent is evaporated, the obtained 6-hydroxy-4'-isoamyloxy-flavone is recrystallized out of ethanol.

In the same manner, the following compounds are produced:

6-hydroxy-4'-n-propoxy-flavone
6-hydroxy-4'-isopropoxy-flavone
6-hydroxy-4'-n-butoxy-flavone
6-hydroxy-4'-isobutoxy-flavone
6-hydroxy-4'-n-amyloxy-flavone
6-hydroxy-4'-n-hexyloxy-flavone
6-hydroxy-4'-isohexyloxy-flavone
6-hydroxy-4'-(2-dimethylaminoethoxy)-flavone
6-hydroxy-4'-(3-dimethylaminopropoxy)-flavone If the free 6-hydroxy-flavones are heated with acetic anhydride in pyridine for one hour under reflux conditions, the corresponding 6-acetoxy compounds are obtained. Analogously, the corresponding 6-propionoxy, 6-butyroxy, 6-valeroyloxy, and 6-caproyloxy compounds are obtainable.

Example 35

Under cooling, 10 ml. 15% hydrogen peroxide and 15 ml. 16% solution of sodium hydroxide are added to a solution of 1.4 g. 6-methoxy-4'-(2-dimethylaminoethoxy)-flavanone in 90 ml. methanol. After 4 hours stirring and standing overnight at room temperature, the mixture is acidified with dilute sulfuric acid and the precipitate is removed by suction. The alcoholic solution of the substance is placed upon a silica gel column, and the latter is eluted with a mixture of a dilute solution of sodium hydroxide/methanol. The eluted substance is concentrated, mixed withe the same volume of water, and extracted with chloroform. The organic phase is washed, dried with sodium sulfate, the solvent is distilled off and the residue is crystallized out of ethanol, pure 6-methoxy-4'-(2-dimethylaminoethoxy)-flavonol being obtained; M.P. 197°.

In place of the methanol, it is also possible to employ a mixture of ethanol and dioxane.

Analogously, the following compounds are produced:

6-methoxy-4'-hydroxy-flavonol, M.P. 270–271°
6,3',4'-trimethoxy-flavonol, M.P. 188–189°
6-methoxy-3',4'-methylenedioxy-flavonol, M.P. 211–212°
6-methoxy-4'-(3-dimethylaminopropoxy)-flavonol, M.P. 137–138°
6-methoxy-4'-(2-diethylaminoethoxy)-flavonol
6-methoxy-4'-(2-pyrrolidinoethoxy)-flavonol
6-methoxy-4'-(2-piperidinoethoxy)-flavonol
6-methoxy-4'-(2-morpholinoethoxy)-flavonol
6-acetamido-4'-methoxy-flavonol
6-acetamido-4'-ethoxy-flavonol
6-acetamido-4'-isopropoxy-flavonol
6-acetamido-4'-isobutoxy-flavonol
6-acetamido-4'-isoamyloxy-flavonol
6-acetamido-4'-(2-dimethylaminoethoxy)-flavonol
6-acetamido-4'-(3-dimethylaminopropoxy)-flavonol
6,4'-bis-(dimethylamino)-flavonol
6,4'-bis-(diethylamino)-flavonol and from the tetrahydropyranylethers of the corresponding 6-hydroxy-flavanones:

6-hydroxy-3',4'-dimethoxy-flavonol, M.P. 272–273°
6-hydroxy-3',4'-methylenedioxy-flavonol, M.P. 297–298°
6-hydroxy-4'-(2-dimethylaminoethoxy)-flavonol
6-hydroxy-4'-(2-diethylaminoethoxy)-flavonol
6-hydroxy-4'-(2-pyrrolidinoethoxy)-flavonol
6-hydroxy-4'-(2-piperidinoethoxy)-flavonol
6-hydroxy-4'-(3-dimethylaminopropoxy)-flavonol For producing the 6-hydroxy-flavonols, it is also possible to start directly with the 6-hydroxy-flavanones and to carry out the reaction in an aqueous solution of sodium hydroxide, without adding an organic solvent.

Analogously, the 4'-methoxy-flavonol-6-oxy acetic acid, having a melting point of 233–234° is obtained (out of ethanol) by treating 4'-methoxy-flavanone-6-oxy acetic acid ethyl ester with hydrogen peroxide in an aqueous/methanolic solution of sodium hydroxide at room temperature. Under the influence of the alkaline reaction medium, a saponification of the ester group takes place simultaneously.

Example 36

A solution of 3.6 g. 3-bromo-6-methoxy-4'-isoamyloxy-flavanone in 45 ml. ethanol is mixed with 20 ml. of a 10% potassium hydroxide solution and stirred for 20 minutes at room temperature. The mixture is diluted with water, the separated 6-methoxy-4'-isoamyloxy-flavone is filtered off, washed with water, and recrystallized from ethanol.

In an analogous manner, other 6-alkoxy flavones are obtainable.

Example 37

A solution of 3.4 g. 6-methoxy-4'-isoamyloxy-flavanone in 150 ml. ether is slowly mixed alternately with 7.7 g. pentyl nitrite and 2 ml. concentrated hydrochloric acid, is allowed to stand overnight at 0° and is then stirred into 100 ml. 2% solution of sodium hydroxide. The aqueous layer is acidified with acetic acid and extracted with benzene. The crude isonitrosoketone obtained after the benzene is evaporated is dissolved in 40 ml. acetic acid and a solution of 3.1 g. stannous chloride in 6.2 ml. concentrated hydrochloric acid is added thereto. The precipitate which separated after the mixture was allowed to stand for a longer period of time, is filtered off, washed with a little acetic acid, and the 3-amino compound is freed by stirring for 40 minutes with 40 ml. 10% solution of sodium hydroxyde. The mixture is extracted with chloroform and the extract is washed with water and dried with sodium sulfate. The 3-amino-6-methoxy-4'-isoamyloxy-flavone remaining after the chloroform has been removed is recrystallized out of ethanol.

Analogously, the following compounds are produced:

3-amino-6,4'-dimethoxy-flavone
3-amino-6-methoxy-4'-ethoxy-flavone
3-amino-6-methovy-4'-isopropoxy-flavone
3-amino-6-methoxy-4'-isobutoxy-flavone
3-amino-6-methoxy-4'-(2-dimethylaminoethoxy)-flavone
3-amino-6-methoxy-4'-(3-dimethylaminopropoxy)-flavone Example 38

1.5 g. 6-acetamido-4'-isobutoxy-flavanone and 4.5 g. chloranil are boiled, under stirring, in 100 ml. tert. butanol for 3 hours. The excess chloranil is filtered off, the filtrate is concentrated to dryness, the residue is taken up in chloroform and the organic phase is washed with water, potassium carbonate solution, and again with water. After the solvent has been driven off, the 6-acetamido-4'-isobutoxy-flavone is derived from the dried extract.

Analogously, the following compounds are produced:

6-acetamido-4'-methoxy-flavone
6-acetamido-4'-ethoxy-flavone
6-acetamido-4'-isopropoxy-flavone
6-acetamido-4'-isoamyloxy-flavone
6-acetamido-4'-(2-dimethylaminoethoxy)-flavone
6-acetamido-4'-(3-dimethylaminopropoxy)-flavone By 8 hours boiling of these substances with 10% methanolic hydrochloric acid, the hydrochlorides of the corresponding 6-amino compounds are produced.

Example 39

1 g. 3 - isonitroso-6-methoxy-4'-isoamyloxy-flavanone (produced as in Example 37) is dissolved in glacial acetic acid. 10% sulfuric acid is added until the solution becomes cloudy. Then, heating on the steam bath is carried out for 30 minutes, and subsequently, the solution is cooled to room temperature. After being allowed to stand overnight, the separated 6-methoxy-4'-isoamyloxy-flavonol is filtered off and recrystallized out of ethanol; M.P. 144–145°.

Example 40

0.45 g. 3-hydroxy-6-methoxy-4'-isoamyloxy-flavanone and 1 g. cinnamic acid (phenyl acrylic acid) are heated to boiling in 20 ml. water with 0.15 g. 10% palladium charcoal, under stirring for 20 minutes. After cooling, ethanol is added, the mixture is heated and filtered in the warm state. The filtrate is mixed with aqueous sodium bicarbonate solution, the separated 6-methoxy-4'-isoamyloxy-flavonol is filtered off, washed with water, and recrystallized from ethanol; M.P. 144–145°.

Example 41

2 g. 3-methyl-6-tetrahydropyranyloxy-4'-ethoxy-flavane are boiled in 50 ml. 5% aqueous ethanolic hydrochloric acid for 2½ hours under reflux conditions. After cooling, the mixture is worked up with chloroform and water, 3-methyl-6-hydroxy-4'-ethoxy-flavane being obtained.

Analogously 3-methyl-6-hydroxy-4'methoxy-flavane (melting point 142°, from ether) and 3-methyl-6-hydroxy-4'-isoamyloxy-flavane can be obtained.

Example 42

A solution of 2.5 g. magnesium iodide is added to a solution of 0.3 g. 3-methyl-6,4'-dimethoxy-flavone in 100 ml. anhydrous benzene. The solvent is distilled off in vacuum and the residue is heated for 2 hours at 180°. The reaction mixture is mixed with dilute sulfuric acid, the precipitate is filtered off, and is dissolved in boiling water. After extracting with hot benzene, the aqueous phase is separated and cooled, 3-methyl-6,4'-dihydroxy-flavone being separated.

Example 43

1 g. 6-methoxy-4'-benzyloxy-flavanone is hydrogenated in 50 ml. ethyl acetate saturated with hydrochloric acid, this hydrogenation being carried out on 5% palladium charcoal at 35°, until the calculated hydrogen quantity has been absorbed. The catalyst is filtered off, the solvent is removed, and the obtained 6-methoxy-4'-hydroxy-flavanone is recrystallized from methanol; M.P. 178–179°.

Example 44

0.2 g. 6-hydroxy-4'-isoamyloxy-flavanone are boiled with 0.2 g. decyl bromide and 0.1 g. anhydrous potassium carbonate in 5 ml. dry acetone for 24 hours under reflux conditions. Then the acetone is distilled off in vacuum, the residue is mixed with water and extracted wtih chloroform. The chloroform is distilled off; the obtained 6-decyloxy-4'-isoamyloxy-flavanone is purified by recrystallization out of ethanol.

Analogously, other 6,4'-dialkoxy and 6,3',4'-trialkoxy-flavanoids having the same or different alkoxy groups are obtainable.

Example 45

2.5 g. 6,4'-dihydroxy-flavone (obtained by reaction of 2-hydroxy-5-benzyloxyacetophenone with p-benzyloxy benzoic acid chloride, rearrangement of the obtained ester with potassium hydroxide in pyridine, and ring closure with concentrated hydrochloric acid/glacial acetic acid with simultaneous splitting off of ether), 4.8 g. isopropylbromide, and 13.2 g. anhydrous potassium carbonate are reacted in 30 ml. dry acetone, as described in Example 13, and the reaction mixture is worked up. As end product, 6,4-di-isopropoxyflavone is isolated.

Analogously, the following compounds are obtained by reaction with the corresponding chlorides or bromides:

6,4'-di-n-propoxy-flavone
6,4'-di-n-butoxy-flavone
6,4'-di-sec. butoxy-flavone
6,4'-di-isobutoxy-flavone
6,4'-di-n-amyloxy-flavone
6,4'-di-isoamyloxy-flavone
6,4'-di-n-hexyloxy-flavone
6,4'-di-isohexyloxy-flavone
6,4'-di-heptyloxy-flavone
6,4'-di-octyloxy-flavone
6,4'-di-nonyloxy-flavone
6,4'-di-decyloxy-flavone
6,4'-bis-(2-dimethylaminoethoxy)-flavone
6,4'-bis-(2-dimethylaminoethoxy)-flavone
6,4'-bis-(3-dimethylaminopropoxy)-flavone

Example 46

1.4 g. 6-hydroxy-3',4'-methylenedioxy-flavanone, 0.9 g. bromoacetic acid ethyl ester (or chloroacetic acid ethyl ester) and 0.7 g. potassium carbonate are boiled for 24 hours in 15 ml. absolute acetone under reflux conditions. The mixture is mixed with water and extracted with chloroform. From the extract, 3',4'-methylene-dioxy-flavanone-6-oxyacetic acid ethyl ester is obtained which melts, after recrystallization from ethanol, at 136–138°.

Analogously, the following compounds can be produced:

4'-methoxy-flavanone-6-oxyacetic acid ethyl ester, M.P. 120°

4'-isoamyloxy-flavanone-6-oxyacetic acid ethyl ester, M.P. 92–93°

4'-dimethylamino-flavanone-6-oxyacetic acid ethyl ester, M.P. 151–152°

3-methyl-4'-methoxy-flavanone-6-oxyacetic acid ethyl ester, M.P. 92–93°

3-methyl-4'-dimethylamino-flavanone-6-oxyacetic acid ethyl ester, M.P. 137–138°

3',4'-dimethoxy-flavanone-6-oxyacetic acid ethyl ester, M.P. 130–131°

3-methyl-3',4'-dimethoxy-flavanone-6-oxyacetic acid ester, M.P. 100–101°

3-methyl-3',4'-methylenedioxy-flavanone-6-oxyacetic acid ethyl ester, M.P. 114–115°

4'-ethoxy-flavanone-6-oxyacetic acid ethyl ester
4'-isopropoxy-flavanone-6-oxyacetic acid ethyl ester
4'-isobutoxy-flavanone-6-oxyacetic acid ethyl ester
4'-isoamyloxy-flavanone-6-oxyacetic acid ethyl ester
3-methyl-3'-methoxy-4'-ethoxy-flavanone-6-oxyacetic acid ethyl ester
3-methyl-3'-methoxy-4'-isopropoxy-flavanone-6-oxyacetic acid ethyl ester
3-methyl-3'-methoxy-4'-iobutoxy-flavanone-6-oxyacetic acid ethyl ester
3-methyl-3'-methoxy-4'-isoamyloxy-flavanone-6-oxyacetic acid ethyl ester
3-methyl-3'-methoxy-4'-(2-dimethylaminoethoxy)-flavanone-6-oxyacetic acid ethyl ester
3-methyl-3'-methoxy-4'-(3-dimethylaminopropoxy)-flavanone-6-oxyacetic acid ethyl ester
3-methyl-3',4'-methylenedioxy-flavanone-6-oxyacetic acid ethyl ester
3-methyl-3',4'-ethylenedioxy-flavanone-6-oxyacetic acid ethyl ester
3-methyl-3',4'-propylenedioxy-flavanone-6-oxyacetic acid ethyl ester as well as 4'-methoxy-, 4'-ethoxy-, 4'-isopropoxy-, 4'-n-butoxy and 4'-isoamyloxy-flavane-6-oxyacetic acid ethyl ester,
4'-methoxy (M.P. 175°), 4'-ethoxy-, 4'-isopropoxy-, 4'-isobutoxy- and 4'-isoamyloxy-flavone 6-oxyacetic acid ethyl ester
3',4'-ethylenedioxy-flavanone-6-oxyacetic acid ethyl ester
3'-methoxy-4'-isoamyloxy-flavanone-6-oxyacetic acid ethyl ester
3'-methoxy-4'-(2-dimethylaminoethoxy)-flavanone-6-oxyacetic acid ethyl ester After boiling the obtained esters with 2-n-ethanolic potassium hydroxide solution for 1 hour, there is obtained, after acidifying, the corresponding flavanone-6-oxyacetic acids, flavane-6-oxyacetic acids, or flavone-6-oxyacetic acids.

If the bromoacetic acid ethyl ester is replaced by chloro- or bromoacetic acid methyl ester, analogously the corresponding flavane-6-oxyacetic acid methyl esters are obtained.

If other α-chloro and/or α-bromo-fatty acid esters are used, the corresponding α-(flavane-6-oxy)-fatty acid esters are obtained, for example:

3-methyl-4'-methoxy-flavane-6-oxy-α-isoamyl-acetic acid methyl ester, M.P. 90–92° (with α-bromoisocapronic acid methyl ester)

3 - methyl - 3',4' - methylenedioxy-flavanone-6-oxy-α-isoamyl-acetic acid ethyl ester (with α-bromoisocapronic acid ethyl ester)

3-ethyl-4'-n-butoxy-flavane - 6 - oxy-α-methyl-acetic acid ethyl ester (with α-bromopropionic acid ethyl ester)

If chloro- or bromo-acetonitrile is employed, the corresponding flavane-6-oxy-acetonitriles are obtained, for example: 4'-methoxy-, 4'-ethoxy-, 4'-isopropoxy-, 4'-isobutoxy-, 4'-isoamyloxy-, 4'-(2-dimethylaminoethoxy)-, 4'-(3-dimethylaminopropoxy)-, 3',4'-dimethoxy-, 3',4'-methylenedioxy- and 3-methyl-3',4'-ethylenedioxy-flavanone-6-oxy-acetonitrile, 4'-methoxy-, 4'-ethoxy-, 4'-isopropoxy-, 4'-isobutoxy-, 4'-isoamyloxy-, 4'-(2-dimethylaminoethoxy)- and 4'-(3-dimethylaminopropoxy)-flavone-6-oxy-acetonitrile.

Example 47

2.5 g. 6-hydroxy-4'-methoxy-flavanone, 0.9 g. chloracetamide, and 2.5 g. anhydrous potassium carbonate are boiled, with stirring, in 25 ml. anhydrous acetone for 48 hours in a nitrogen atmosphere. Then, the acetone is distilled off in vacuum, the residue is mixed with water and extracted with chloroform. The chloroform is distilled off, the obtained 4'-methoxy-flavanone-6-oxyacetic acid amide is purified by recrystallization from ethanol M.P. 218°.

Analogously, the following compounds are produced by reacting the corresponding 6-hydroxy-flavane derivatives with chloro- or bromo-acetamides, such as chloro- or bromoacetic acid dimethylamide, diethylamide, pyrrolidide, morpholide, or piperidide:

3-methyl-4'-methoxy-flavanone-6-oxyacetic acid amide, M.P. 193–194°

4'-methoxy-flavanone-6-oxyacetic acid pyrrolidide, M.P. 187–188°

3-methyl-4'-dimethylamino-flavanone-6-oxyacetic acid-pyrrolidide, M.P. 170–171° (hydrochloride, M.P. 197° with decomposition)

3-methyl-3',4'-methylenedioxy-flavanone-6-oxyacetic acid pyrrolidide, M.P. 164–166°

4'-methoxy-flavanone-6-oxyacetic acid-dimethylamide
4'-methoxy-flavanone-6-oxyacetic acid diethylamide
4'-methoxy-flavanone-6-oxyacetic acid-piperidide 4'-methoxy-flavanone-6-oxyacetic acid-morpholide as well as the corresponding amides of the 4'-ethoxy-, 4'-isopropoxy-, 4'-isobutoxy-, 4'-isoamyloxy-, 4'-(2 - dimethylaminoethoxy)- and 4'-(3-dimethylaminopropoxy)-flavanone-6-oxyacetic acids, of the 4'-methoxy-, 4'-ethoxy-, 4'-isopropoxy-, 4'-isobutoxy-, 4'-isoamyloxy-, 4'-(2-dimethylaminoethoxy)- and 4'-(3-dimethylaminopropoxy)-flavane-6-oxyacetic acids, and of the 4'-methoxy-, 4'-ethoxy-, 4'-isopropoxy-, 4'-isobutoxy-, 4'-isoamyloxy-, 4'-(2-dimethylaminoethoxy)- and 4'-(3-dimethylaminopropoxy)-flavanone-6-oxyacetic acids.

If, in place of the chloroacetamide, other α-chloro- and/or α-bromo-fatty acid amides are used, α-(flavane-6-oxy)-fatty acid amides are obtained, for example there is obtained from 3-methyl-6-hydroxy- 3',4'-dimethoxy-flavanone and α-bromoisocapronic acid morpholide the α - (3-methyl-3',4'-dimethoxy-flavanone-6-oxy) - isocapronic acid morpholide.

Example 48

1 g. 6-hydroxy-4'-methoxy-flavane are heated to 50° with 5 ml. pyridine and 5 ml. acetic anhydride for 5 hours. After cooling, the mixture is worked up with water and chloroform, and the 6-acetoxy-4'-methoxy-flavane is crystallized out of methanol; M.P. 90°.

Analogously, the following compounds are obtained by acylation of the corresponding 6-hydroxy compounds:

3,4'-dimethoxy-6-acetoxy-flavane, M.P. 136–139°
3-methyl-6-acetoxy-4'-methoxy-flavane, M.P. 127–128°
3-methyl-6-acetoxy-3',4'-methylenedioxy - flavane, M.P. 125–127°
6-trimethylacetoxy-4'-methoxy-flavane
6-caproyloxy-4'-methoxy-flavane Example 49

2 g. 3-ethyl-4'-butoxy-flavane-6-oxyacetic acid are dissolved in ether and mixed with excess ethereal diazomethane solution. After 30 minutes, acetic acid is added, all solvents are removed under reduced pressure, and the produced 3 - ethyl-4'-n-butoxy-flavane-6-oxyacetic acid methyl ester is recrystallized from methanol.

Analogously, the 3,6,3',4'-tetramethoxy flavone is obtained from 6,3',4'-trimethoxy flavonol (reaction time 20 hours).

Example 50

2 g. 4'-ethoxy-flavane-6-oxyacetic acid amide are dissolved in 40 ml. absolute benzene and are mixed with a suspension of 2 g. sodium amide in 10 ml. toluene, as well as 5 g. n-propylbromide. The mixture is boiled for 5 hours under reflux conditions, is poured on ice, and the benzene phase is separated, washed by water, dried over sodium sulfate, and concentrated; there is obtained 4'-ethoxy-flavane-6-oxyacetic acid-di-n-propylamide.

Example 51

0.6 g. 6,4'-dinitroflavanone are boiled for 4 hours with 3 g. iron powder in a mixture of 50 ml. acetone and 20 ml. 10%-acetic acid. The solution is filtered in the hot state; after cooling, 6,4'-diamino-flavanone is separated.

By adding ethereal hydrochloric acid to a concentrated ethanolic solution of the diamine, the dihydrochloride of the diamine is obtained.

Analogously, it is possible to obtain, from 6,3'-dinitro-4'-methoxy-flavanone, the 6,3'-diamino-4'-methoxy-flavanone and its dihydrochloride, and from 6,4'-dinitro-flavone, the 6,4'-diamino-flavone and its dihydrochloride.

Example 52

2.4 g. 6,4'-diamino-flavanone and 4.4 g. ethyl bromide are boiled under reflux conditions for 5 hours in 50 ml. ethanol. After the solvent is distilled off, there remains 6,4'-bis(diethylamino)-flavanone. It is dissolved in ether and mixed with an excess of ethereal hydrochloric acid. The precipitated dihydrochloride of the 6,4'-bis-(diethylamino)-flavanone is removed by suction, washed with ether, and subsequently dried.

Analogously, when using methyl iodide in place of the ethyl bromide, the 6,4'-bis(dimethylamino)-flavanone and its dihydrochloride can be obtained. When using the corresponding alkylbromides, it is further possible to produce 6,4'-bis-(dipropylamino)- and 6,4'-bis(di-n-butylamino)-flavanone and their dihydrochlorides in analogous manner.

In an analogous manner, the following compounds and their dihydrochlorides are obtainable—

6,3'-bis-(diethylamino)-4'-methoxy-flavanone
6,3'-bis-(dimethylamino)-4'-methoxy-flavanone
6,3'-bis-(dipropylamino)-4'methoxy-flavanone
6,3'-bis-(di-n-butylamino)-4'-methoxy-flavanone
6,4'-bis-(dimethylamino)-flavone
6,4'-bis-(diethylamino)-flavone
6,4'-bis-(dipropylamino)-flavone
6,4'-bis-(di-n-butylamino)-flavone

Example 53

2 g. 6,4'-diamino-flavanone are mixed with 10 ml. of a mixture containing equal parts of pyridine and acetic acid anhydride; the mixture is allowed to stand for 18 hours at room temperature. Then, the mixture is stirred into ice water and the precipitate is removed by suction. By recrystallization from glacial acetic acid, the 6,4'-bis-(acetamido)-flavanone is obtained in pure form.

Analogously, 6,3'-bis(acetamido)-4'- ethoxy - flavanone and 6,4'-bis-(acetamido)flavone are obtainable.

If the acetic acid anhydride is replaced by propionic acid anhydride, 6,4'-bis-(propionamido)-flavanone is obtained.

Analogously, 6,3'- bis - (propionamido)-4'-isoamyloxy-flavanone and 6,4'-bis-(propionamido)-flavone are obtainable.

Example 54

A solution of 3.3 g. 6,4'-bis-(acetamido)-flavanone in 50 ml. absolute dioxane is added to a suspension of 2.5 g' lithium aluminum hydride in 50 ml. absolute dioxane, and the mixture is boiled for 10 hours under reflux conditions. The excess lithium aluminum hydride is decomposed by aqueous dioxane, is briefly boiled with the admixture of 2 ml. 20% solution of sodium hydroxide, and is filtered off after the addition of 6 ml. water. The filtrate is concentrated to dryness and the residue is dissolved in a little ethanol. Upon the addition of ethereal hydrochloric acid, the dihydrochloride of the 4-hydroxy-6,4'-bis-(ethylamino)-flavane precipitates.

Analogously, the following compounds can be produced:

4-hydroxy-6,4'-bis-(propylamino)-flavane
4-hydroxy-6,3'-bis-(ethylanimo)-4'-ethoxy-flavane
4-hydroxy-6,3'-bis-(propylanimo)-4'-isoamyloxy-flavane By analogous reduction of 6,4'-bis-(acetamido)-flavone-4,4'-ethylene-ketal (produced from ketalization of the flavone by means of ethylene glycol) and subsequent hydrolysis of the ketal group by allowing the mixture to stand for 24 hours with aqueous-ethanolic hydrochloric acid at 30°, 6,4'-bis-(ethylamino)-flavone-dihydrochloride is obtained.

Analogously, 6,4'-bis-(propylamino)-flavone - dihydrochloride is produced.

Example 55

A solution of 1.5 g. 6,3'-dimethoxy-4'-(2-dimethylaminoethoxy)-flavanone oxime (obtained analogously to Example 65) in 30 ml. absolute tetrahydrofuran is added to a suspension of 1 g. lithium aluminum hydride in 200 ml. absolute ether and subsequently boiled for 10 hours. Then, 50 ml. solvent are distilled off in vacuum and 100 ml. ethereal hydrochloric acid is added. The dihydrochloride of the 4-amino-6,3'-dimethoxy-4'-(2-dimethylaminoethoxy)-flavane is precipitated.

In an analougous manner, the hydrochlorides or dihydrochlorides, respectively, of the following compounds can be obtained from the corresponding flavanone oximes:

4-amino-6-methoxy-4'-isopropoxy-flavane
4-amino-6-methoxy-4'-isobutoxy-flavane
4-amino-6-methoxy-4'-isoamyloxy-flavane
4-amino-6-methoxy-4'-(2-dimethylaminoethoxy)-flavane
4-amino-6-methoxy-4'-(3-dimethylaminopropoxy)-flavane
4-amino-6,3'-dimethoxy-4'-ethoxy-flavane
4-amino-6,3'-dimethoxy-4'-isopropoxy-flavane
4-amino-6,3'-dimethoxy-4'-isobutoxy-flavane
4-amino-6,3'-dimethoxy-4'-isoamyloxy-flavane
4-amino-6,3'-dimethoxy-4'-(3-dimethylaminopropoxy)-flavane
4-amino-6-methoxy-3',4'-methylenedioxy-flavane
4-amino-6-methoxy-3',4'-ethylenedioxy-flavane

Example 56

4-oximino-6-hydroxy-4'-methoxy-flavane, obtained from the corresponding flavanone by reaction with hydroxylamine, is hydrogenated in glacial acetic acid with palladium charcoal at room temperature and 6 atmospheres. The catalyst is filtered off, the solvent is distilled off, and the residue is dissolved in a little ethanol and mixed with ethereal hydrochloric acid. After being allowed to stand for a longer period of time, the 4-amino-6-hydroxy-4'-methoxy-flavane-hydrochloride precipitates; M.P. 224–226°.

Example 57

1.8 g. 3',4'-dimethoxy-flavanone-6-oxyacetic acid ethyl ester is added, under stirring, to a solution of 1.1 g. pyrrolidine in 50 ml. absolute benzene and is boiled for 6 hours under reflux conditions. After cooling, crude 3',4'-dimethoxy-flavanone-6-oxyacetic acid pyrrolidide precipitates which is obtained in pure form by recrystallization from ethanol.

In an analogous manner, the following compounds can be obtained from the corresponding flavane-6-oxyacetic acid ethyl esters:

4'-methoxy-flavane-6-oxyacetic acid pyrrolidide, M.P. 208–210°
3',4'-propylenedioxy-flavanone-6-oxyacetic acid-pyrrolidide
3'-methoxy-4'-ethoxy-flavanone-6-oxyacetic acid-pyrrolidide
3'-methoxy-4'-isopropoxy-flavanone-6-oxyacetic acid-pyrrolidide
3'-methoxy-4'-isobutoxy-flavanone-6-oxyacetic acid-pyrrolidide
3'-methoxy-4'-(3-dimethylaminpropoxy)-flavanone-6-oxyacetic acid-pyrrolidide
4'-methoxy-flavane-6-oxyacetic acid pyrrolidide If the reaction is carried out with morpholine, piperidine, N-methyl-piperazine, or diethylamine ,the corresponding morpholides, piperidides, N-methyl-piperazides, and diethylamides are obtained.

Example 58

A solution of 3.5 g. 6,3'-dimethoxy-4'-isoamyloxy-flavanone in 20 ml. absolute chloroform is mixed, at 0°, with a solution of 1.6 g. bromine in 30 ml. absolute chloroform and irradiated with ultraviolet light. After a short time, the solution is decolorized. After 20 minutes, the irradiation is stopped, the chloroform solution is washed with water, and subsequently dried over sodium sulfate. After the solvent is distilled off, the crude 3-bromo-6,3'-dimethoxy-4'-isoamyloxyflavanone remains which is recrystallized out of methanol.

Analogously, the following compounds are produced:

3-bromo-6-methoxy-4'-isopropoxy-flavanone
3-bromo-6-methoxy-4'-isobutoxy-flavanone
3-bromo-6-methoxy-4'-isoamyloxy-flavanone
3-bromo-6-methoxy-4'-(2-dimethylaminoethoxy)-flavanone
3-bromo-6-methoxy-4'-(3-dimethylaminopropoxy)-flavanone
3-bromo-6,3'-dimethoxy-4'-isopropoxy-flavanone
3-bromo-6,3'-dimethoxy-4'-isobutoxy-flavanone
3-bromo-6,3'-dimethoxy-4'-(2-dimethylaminoethoxy)-flavanone
3-bromo-6,3'-dimethoxy-4'-(3-diemthylaminopropoxy)-flavanone
3-bromo-6-methoxy-3',4'-methylenedioxy-flavanone
3-bromo-6-methoxy-3',4'-ethylenedioxy-flavanone
3-bromo-6-methoxy-3',4'-propylenedioxy-flavanone

Example 59

3.6 g. 6-acetoxy-3'-methoxy-4'-isobutoxy-flavanone, obtained by acetylation of 6-hydroxy-3'-methoxy-4'-isobutoxy-flavanone (see Example 4), 1.78 g. N-bromo succinimide and 0.22 g. benzoyl peroxide are boiled for 20 minutes in 30 ml. carbon tetrachloride. Then, the mixture is cooled in ice, the produced succinimide is filtered off and is washed with carbon tetrachloride. The filtrate is washed successively with water, aqueous solutions of potassium iodide and sodium thiosulfate, and then again with water and is dried over sodium sulfate. The solvent is removed and the oily 3-bromo-6-acetoxy-3'-methoxy-4'-isobutoxy-flavanone is crystallized by treating with ethanol and water.

Analogously, the following compounds are produced:

3-bromo-6-acetoxy-4'-isopropoxy-flavanone
3-bromo-6-acetoxy-4'-isobutoxy-flavanone
3-bromo-6-acetoxy-4'-isoamyloxy-flavanone
3-bromo-6-acetoxy-4'-(2-dimethylaminoethoxy)-flavanone
3-bromo-6-acetoxy-4'-(3-dimethylaminopropoxy)-flavanone
3-bromo-6-acetoxy-3'-methyoxy-4'-ethoxy-flavanone
3-bromo-6-acetoxy-3'-methoxy-4'-isopropoxy-flavanone
3-bromo-6-acetoxy-3'-methoxy-4'-isoamloxy-flavanone
3-bromo-6-acetoxy-3'-methoxy-4'-(2-dimethylaminoethoxy)-flavanone
3-bromo-6-acetoxy-3'-methoxy-4'-(3-dimethylaminpropoxy)-flavanone
3-bromo-6-acetoxy-3',4'-methylenedioxy-flavanone
3-bromo-6-acetoxy-3',4'-ethylenedioxy-flavanone
3-bromo-6-acetoxy-3',4'-propylenedioxy-flavanone If N-chloro or N-iodo succinimide respectively is used in place of the N-bromo-succinimide, the corresponding 3-chloro- and 3-iodo flavanones, respectively can be obtained.

Example 60

A mixture of 1.43 g. 6,4'-dimethoxy-flavone, 0.89 g. N-bromo-succinimide, and 15 ml. carbon tetrachloride are boiled for 5 hours under irradiation of ultraviolet light, 0.1 ml. dry pyridine being added after 30 minutes. Then, the mixture is allowed to stand overnight. The carbon tetrachloride phase is separated, washed with water and dried over sodium sulfate. The solvent is distilled off. The recrystallization of the residue from ethanol results in 3-bromo-6,4'-dimethoxy-flavone.

Analogously, the following compounds are produced:

3-bromo-6-methoxy-4'-ethoxy-flavone
3-bromo-6-methoxy-4'-isopropoxy-flavone
3-bromo-6-methoxy-4'-isobutoxy-flavone
3-bromo-6-methoxy-4'-isoamyloxy-flavone Starting from the corresponding 6-acetoxy-flavones, the following compounds are produced in analogous manner:

3-bromo-6-acetoxy-4'-isopropoxy-flavone
3-bromo-6-acetoxy-4'-isobutoxy-flavone
3-bromo-6-acetoxy-4'-isoamyloxy-flavone
3-bromo-6-acetoxy-4'-(2-dimethylaminoethoxy)-flavone
3-bromo-6-acetoxy-4'-(3-dimethylaminopropoxyl)-flavone When using N-chloro and N-iodo-succinimide, resspectively, in place of the N-bromo-succinimide, the corresponding 3-chloro- and 3-iodo-flavones, respectively, are obtained.

Example 61

A solution of 1 g. 6-hydroxy-3'-methoxy-4'-isoamyloxy-flavanone in 20 ml. 2 n sodium hydroxide is cooled to 0°, slowly mixed with 1 ml. 30% hydrogen peroxide and kept at 0° for 15 hours. After adding a further quantity of 30% hydrogen peroxide (1 ml.) and after standing for 24 hours at 0°, the mixture is acidified by means of acetic acid to pH 6. The mixture is extracted with ethyl acetate, the extract is washed, dried over sodium sulfate, and chromatographed, after concentration, over neutral aluminum oxide. The 3,6-dihydroxy-3'-methoxy - 4' - isoamyloxy-flavanone is eluted with a mixture of equal parts of chloroform and acetone and is obtained in pure form by recrystallization from ethanol.

Analogously, the following compounds are produced:

3,6-dihydroxy-4'-isopropoxy-flavanone
3,6-dihydroxy-4'-isobutoxy-flavanone
3,6-dihydroxy-4'-isoamyloxy-flavanone
3,6-dihydroxy-4'-(2-dimethylaminoethoxy)flavanone
3,6-dihydroxy-4'-(3-dimethylaminopropoxy)-flavanone
3,6-dihydroxy-3'-methoxy-4'-isopropoxy-flavanone
3,6-dihydroxy-3'-methoxy-4'-isobutoxy-flavanone
3,6-dihydroxy-3'-methoxy-4'-(2-dimethylaminoethoxy)-flavanone
3,6-dihydroxy-3'-methoxy-4'-(3-dimethylaminopropoxy)-flavanone
3,6-dihydroxy-3',4'-methylenedioxy-flavanone
3,6-dihydroxy-3',4'-ethylenedioxy-flavanone
3,6-dihydroxy-3',4'-propylenedioxy-flavanone Example 62

A solution of 2.6 g. 6,3'-dimethoxy-4'-isopropoxy-flavanone in glacial acetic acid is mixed with 4.4 g. lead tetraacetate and kept at 90° for 3 hours. Then, the mixture is cooled, diluted with water, and extracted with ether. The extract is washed with sodium bicarbonate solution and dried over sodium sulfate. The solvent is removed, the residue is chromatographed over neutral aluminum oxide. The 3-acetoxy-6,3'-dimethoxy-4'-isopropoxy-flavanone is eluted with benzene, the former crystalling from methanol in colorless needles.

By boiling 0.85 g. 3-acetoxy-6,3'-dimethoxy-4'-isopropoxy-flavanone in 20 ml. methanol and 2 ml. concentrated hydrochloric acid for 30 minutes, there is obtained 3-hydroxy-6,3'-dimethoxy-4'-isopropoxy-flavanone.

Analogously, the following compounds are produced:

3-hydroxy-6-methoxy-4'-isopropoxy-flavanone
3-hydroxy-6-methoxy-4'-isobutoxy-flavanone
3-hydroxy-6-methoxy-4'-isoamyloxy-flavanone
3-hydroxy-6-methoxy-4'-(2-dimethylaminoethoxy)-flavanone
3-hydroxy-6-methoxy-4'-(3-dimethylaminopropoxy)-flavanone
3-hydroxy-6,3'-dimethoxy-4'-isobutoxy-flavanone
3-hydroxy-6,3'-dimethoxy-4'-isoamyloxy-flavanone
3-hydroxy-6,3'-dimethoxy-4'-(2-dimethylaminoethoxy)-flavanone
3-hydroxy-6,3'-dimethoxy-4'-(3-dimethylaminopropoxy)-flavanone
3-hydroxy-6-methoxy-3',4'-methylenedioxy-flavanone
3-hydroxy-6-methoxy-3',4'-ethylenedioxy-flavanone
3-hydroxy-6-methoxy-3',4'-propylenedioxy-flavanone Example 63

A solution of 3.0 g. 6-methoxy-3',4'-methylenedioxy-flavanone in 150 ml. absolute tert. butanol is added to a solution of 0.43 g. potassium in 300 ml. absolute tert. butanol and 1.8 g. ethyl iodide is added dropwise. The reaction is stirred for 24 hours at room temperature. Then, the solvent is distilled off, the residue is mixed with water, acidified with 5% hydrochloric acid and extracted with chloroform. The residue obtained from the extract is dissolved in 80 ml. ethanol, mixed with a solution of 8.2 g. sodium acetate in 20 ml. water, and boiled for 2 hours under reflux conditions. The reaction mixture is stirred into water and extracted with ether. From the washed and dried extract, the 3-ethyl-6-methoxy-3',4'-methylenedioxy-flavanone crystallizes out after concentration.

When using n-propyl iodide, the 3-n-propyl-6-methoxy-3',4'-methylenedioxy-flavanone is obtained in analogous manner.

Example 64

Hydrogen chloride is introduced at 80–90° for 5 hours into a stirred mixture of 3 g. 6,4'-bis-(dimethylamino)-flavone, 5 g. paraformaldehyde, and 30 ml. 80% acetic acid. Then the mixture is concentrated to half its volume in vacuum, increased in volume to 100 ml. by adding 90% acetic acid, and mixed, in portions, with 8 g. zinc powder. After adding 50 ml. water, the mixture is boiled for 1 hour under stirring. The zinc dust is filtered off, the filtrate is concentrated in vacuum, mixed with water and brought to a pH value of 7.5 by means of a dilute solution of sodium hydroxide. The 3-methyl-6,4'-bis-(dimethylamino)-flavone is extracted with chloroform.

Example 65

0.82 g. sodium acetate and 0.7 g. hydroxylamine hydrochloride was added to a solution of 3.1 g. 6,3',4'-trimethoxy-flavanone in 60 ml. ethanol. After boiling for 3 hours under reflux, the mixture is cooled. The separated oxime is filtered off, washed with water, and dried. The solution of the oxime in 26 ml. dry pyridine is admixed in portions with 3.4 g. p-toluenesulfochloride, is subsequently stirred for 2 hours at room temperature, mixed into ice water, and weakly acidified with dilute sulfuric acid. The precipitated 4 - (p - toluene - sulfonyl - oximino) - 6,3',4' - trimethoxy - flavanone is removed by suction, washed, dried in vacuum, dissolved in 18 ml. absolute benzene, and admixed with a solution of 0.36 g. potassium in 14 ml. absolute ethanol. Subsequently, the stirring operation is continued for 5 hours at 10°. The formed potassium-p-toluenesulfonate is filtered off, the filtrate is concentrated under vacuum and acidified with 12% aqueous hydrochloric acid. The oily precipitate produced thereby is dissolved in a little warm ethanol. After cooling, the pure 3-amino-6,3',4'-trimethoxy-flavanone-hydrochloride is crystallized. The free base is obtained by agitating the ethanolic solution of the salt with a small excess of an aqueous sodium acetate solution; it is extracted from the reaction mixture with chloroform and crystallized out of ethanol.

Analogously, the following compounds and their hydrochlorides are produced:

3-amino-6,4'-dimethoxy-flavanone
3-amino-6-methoxy-4'-ethoxy-flavanone
3-amino-6-methoxy-4'-isopropoxy-flavanone
3-amino-6-methoxy-4'-isobutoxy-flavanone
3-amino-6-methoxy-4'-isoamyloxy-flavanone
3-amino-6-methoxy-4'-(2-dimethylaminoethoxy)-flavanone
3-amino-6-methoxy-4'-(3-dimethylaminopropoxy)-flavanone
3-amino-6,3'-dimethoxy-4'-ethoxy-flavanone
3-amino-6,3'-dimethoxy-4'-isopropoxy-flavanone
3-amino-6,3'-dimethoxy-4'-isobutoxy-flavanone
3-amino-6,3'-dimethoxy-4'-isoamyloxy-flavanone
3-amino-6,3'-dimethoxy-4'-(2-dimethylaminoethoxy)-flavanone
3-amino-6,3'-dimethoxy-4'-(3-dimethylaminopropoxy)-flavanone
3-amino-6-methoxy-3',4'-methylenedioxy-flavanone
3-amino-6-methoxy-3',4'-ethylenedioxy-flavanone
3-amino-6-methoxy-3',4'-propylenedioxy)-flavanone Example 66

0.5 g. 6 - methoxy - 4' - (2 - dimethylaminoethoxy)-flavanone is dissolved in ether and mixed with an excess of methyl iodide.

After the mixture has been allowed to stand for 24 hours, the obtained 6 - methoxy - 4' - (2 - dimethylaminoethoxy)-flavanone-metho-iodide is isolated and recrystallized out of ethanol.

Analogously, the metho-iodides of the remaining (2-dimethylaminoethoxy- and (3 - dimethylaminopropoxy)-flavanones, flavanes, and flavones and the metho-iodides of the remaining mono- and bi-(dialkylamino)-flavanones, flavanes, and flavones are obtainable.

Example 67

The new starting compounds of Examples 20 and 21 can be prepared as follows:

Dry hydrogen chloride is introduced into a solution of 32 g. 2,5-dihydroxy-benzaldehyde and 33 g. p-methoxy-acetophenone in 165 ml. formic acid at 0° C. until the solution is saturated. The mixture is set aside at a cool place over night. The precipitated 6-hydroxy-4'-methoxy-flavylium chloride is filtered. By dilution of the mother liquor with ether, a second fraction is obtained. The crude product is recrystallized from 6% hydrochloric acid. Red-brown crystals decomposing slowly on heating.

Similarly, the following compounds can be prepared:

from 2,5-dihydroxy-benzaldehyde and p-hydroxy-acetophenone in ethyl acetate: 6,4'-dihydroxyflavylium chloride;
from 2-hydroxy-5-methoxy-benzaldehyde and p-methoxy-actophenone in acetic acid: 6,4'-dimethoxyflavylium chloride, F. 150–152°;
from 2,5-dihydroxy-benzaldehyde and p-methoxy-propiophenone (obtained from p-methoxybenzaldehyde and ethylmagnesium bromide followed by hydrolysis and oxidation of the resulting 1-p-methoxyphenyl-1-propanol with chromium trioxide) in ethyl acetate: 3-methyl-6-hydroxy-4'-methoxyflavylium chloride;
from 2,5-dihydroxy-benzaldehyde and 3,4-methylenedioxypropiophenone (obtained from piperonal and ethylmagnesium bromide followed by hydrolysis and oxydation): 3-methyl-6-hydroxy-3',4'-methylenedioxy-flavylium chloride (red crystals, darkening at 200 to 225°);
from 2,5-dihydroxy-benzaldehyde and ω,p-dimethoxy-acetophenone (obtained from p-methoxyphenylmagnesium bromide and methoxyacetonitrile) in acetic acid: 3,4'-dimethoxy-6-hydroxyflavylium-chloride, M.P. 160–161°;
from 2,5-dihydroxy-benzaldehyde and ωmethoxy-3,4-methylenedioxypropiophenone (obtained from 3,4-methylenedioxyphenylmagnesium bromide and methoxyacetonitrile) in acetic acid: 3-methoxy-6-hydroxy-3',4'-methylenedioxyflavylium chloride.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:
1. A compound of the formula

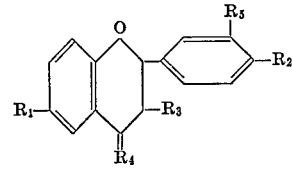

wherein:
$R_1$=OH; acyloxy of 1–6 carbon atoms, the acyl portion being derived from a carboxylic acid; alkoxy of 1–6 carbon atoms; or alkoxy of 1–6 carbon atoms in the alkoxy chain substituted by carbalkoxy of 2–9 carbon atoms by pyrrolidinocarbonyl.
$R_2$=alkoxy of 1–6 carbon atoms; or, together with $R_5$, methylenedioxy;
$R_3$=alkyl of 1–3 carbon atoms; or alkoxy of 1–3 carbon atoms;
$R_4$=$H_2$ or O;
$R_5$=H or $OCH_3$ or, together with $R_2$, methylenedioxy; and wherein the 2,3-position of said compound is optionally connected by a double bond.
2. A compound in claim 1 wherein $R_4$ is $H_2$.

3. A compound of the formula

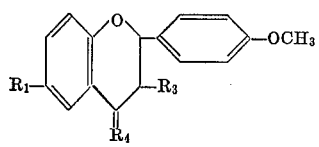

wherein:
$R_1$ is OH or acyloxy of 1–6 carbon atoms, the acyl portion being derived from a carboxylic acid;
$R_4$ is $H_2$ or O; and
$R_3$ is alkyl or alkoxy of 1–3 carbon atoms.
4. 3-methyl - 4'-methoxy - flavane - 6-oxy-α-isoamyl-acetic acid methyl ester.
5. 3-methyl - 3',4'-methylenedioxy-flavanone - 6-oxy-acetic acid ethyl ester.
6. 3-methyl-6-ethoxy-3',4'-dimethoxy-flavanone.
7. 3-methyl-6-ethoxy-4'-isoamyloxy-flavanone.
8. 3',4' - methylenedioxy-flavanone-6 - oxyacetic acid ethyl ester.
9. 4'-methoxy-flavanone-6-oxyacetic acid ethyl ester.
10. 3-methyl-6-acetoxy-4'-methoxy-flavane.
11. 3-ethyl-6-hydroxy-4'-methoxy-flavanone.
12. 3-propyl-6-acetoxy-4'-methoxy-flavane.
13. 3-methyl-6-hydroxy-4'-methoxy-flavane.
14. 3,4'-dimethoxy-6-hydroxy-flavane.
15. 3,4'-dimethoxy-6-acetoxy-flavane.
16. 3-ethoxy-6-acetoxy-4'-methoxy-flavane.
17. 3-isopropoxy-6-hydroxy-4'-methoxy-flavane.
18. 3-ethyl-6-acetoxy-4'-methoxy-flavane.
19. 3-n-propyl-6-hydroxy-4'-methoxy-flavanone.
20. 3-propyl-6-hydroxy-3',4'-methylenedioxy-flavane.
21. 3-ethoxy-6-hydroxy-3',4'-methylenedioxy-flavane.
22. 3-isopropyl-6-acetoxy-4'-methoxy-flavane.
23. 3-methyl-6-hydroxy-4'-methoxy-flavone.
24. 3-ethyl-6-hydroxy-4'-methoxy-flavone.
25. 3 - methoxy - 6-hydroxy-3',4' - methylene-dioxy-flavane.
26. 3-methyl - 4'-methoxy-flavone - 6-oxy-acetic acid pyrrolidide.
27. 3-isopropyl-6-hydroxy-4'-methoxy-flavanone.
28. 3-n-propyl - 6-hydroxy - 3',4' - methylenedioxy-flavanone.
29. 3-methyl-6-hydroxy-3',4'-methylenedioxy-flavane.
30. 3-methyl-6-hydroxy-4'-methoxy-flavanone.
31. 3-methyl-6-hydroxy-4'-isoamyloxy-flavanone.

References Cited

UNITED STATES PATENTS 3,046,275  7/1962  Kohlstaedt et al. _ 260—345.2 X
3,219,531  11/1965  Bloise _____ 260—345.2 X

OTHER REFERENCES

Row et al.: J. Indian Chem. Soc. vol. 40, pp. 521–4 (1963).
Row et al.: Current Sci. (India), vol. 25, pp. 393–4 (1956).
Christian et al.: Chemische Berichte, vol. 90, pp. 1287–9 (1957).
Fischer et al.: Chemische Berichte, vol. 97, pp. 1910–14 (1964).
Raval et al.: J. Org. Chem., vol. 21, pp. 1408–11 (1956).

HENRY R. JILES, *Primary Examiner.*

J. M. FORD, *Assistant Examiner.*

U.S. Cl. X.R.

260—519, 520, 326.8, 326.85, 294, 294.7, 247.2, 247.5, 247.7, 326.5, 999, 345.5, 345.2, 340.3, 348, 619, 592, 570, 612, 613, 345.9, 571, 544